(12) United States Patent
Fujisawa et al.

(10) Patent No.: US 12,175,702 B2
(45) Date of Patent: Dec. 24, 2024

(54) INFORMATION PROCESSING DEVICE, INFORMATION PROCESSING METHOD, AND RECORDING MEDIUM

(71) Applicant: SONY GROUP CORPORATION, Tokyo (JP)

(72) Inventors: Haruka Fujisawa, Kanagawa (JP); Fujio Arai, Tokyo (JP); Hidenori Aoki, Chiba (JP); Ryo Fukazawa, Kanagawa (JP); Keijiroh Nagano, Tokyo (JP); Tomohiko Gotoh, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 656 days.

(21) Appl. No.: 17/438,771

(22) PCT Filed: Apr. 3, 2020

(86) PCT No.: PCT/JP2020/015326
§ 371 (c)(1),
(2) Date: Sep. 13, 2021

(87) PCT Pub. No.: WO2020/209199
PCT Pub. Date: Oct. 15, 2020

(65) Prior Publication Data
US 2022/0164981 A1 May 26, 2022

(30) Foreign Application Priority Data
Apr. 11, 2019 (JP) .................................. 2019-075688

(51) Int. Cl.
*G06T 7/73* (2017.01)
*G06F 3/01* (2006.01)
(Continued)

(52) U.S. Cl.
CPC ................ *G06T 7/73* (2017.01); *G06F 3/011* (2013.01); *G06V 10/761* (2022.01); *G06V 10/771* (2022.01)

(58) Field of Classification Search
CPC . G06T 7/73; G06T 2207/30244; G06T 7/246; G06T 7/292; G06T 19/00;
(Continued)

(56) References Cited

U.S. PATENT DOCUMENTS

2012/0092333 A1* 4/2012 Matsuda ................ G06T 19/006
345/419
2017/0169617 A1 6/2017 Rodriguez, II
(Continued)

FOREIGN PATENT DOCUMENTS

JP 2011-175439 A 9/2011
JP 2015-192436 A 11/2015
(Continued)

*Primary Examiner* — Charles T Shedrick
(74) *Attorney, Agent, or Firm* — Paratus Law Group, PLLC

(57) ABSTRACT

An information processing device including a control unit that controls a display terminal that arranges a virtual object in a real space by using a coordinate system associated with the real space, in which the control unit determines whether to update first spatial information of a first display terminal and second spatial information of a second display terminal, which are used for determining a position of the virtual object, based on a first operation state of the first display terminal and a second operation state of the second display terminal that shares the virtual object with the first display terminal.

15 Claims, 16 Drawing Sheets

(51) Int. Cl.
*G06V 10/74* (2022.01)
*G06V 10/771* (2022.01)

(58) Field of Classification Search
CPC ....... G06F 3/011; G06F 3/012; G06V 10/761; G06V 10/771; G06V 10/94; G06V 20/20
See application file for complete search history.

(56) References Cited

U.S. PATENT DOCUMENTS

| | | | | |
|---|---|---|---|---|
| 2018/0350133 | A1* | 12/2018 | Gervasio | G06T 15/20 |
| 2018/0350135 | A1* | 12/2018 | Castaneda | G06T 19/20 |
| 2018/0350146 | A1* | 12/2018 | Gervasio | G06T 19/006 |

FOREIGN PATENT DOCUMENTS

| | | | | |
|---|---|---|---|---|
| JP | 2016-528476 A | 9/2016 | | |
| WO | WO 2018/136946 A1 | 7/2018 | | |
| WO | WO-2019026713 A1 * | 2/2019 | ......... | G02B 27/0172 |

\* cited by examiner

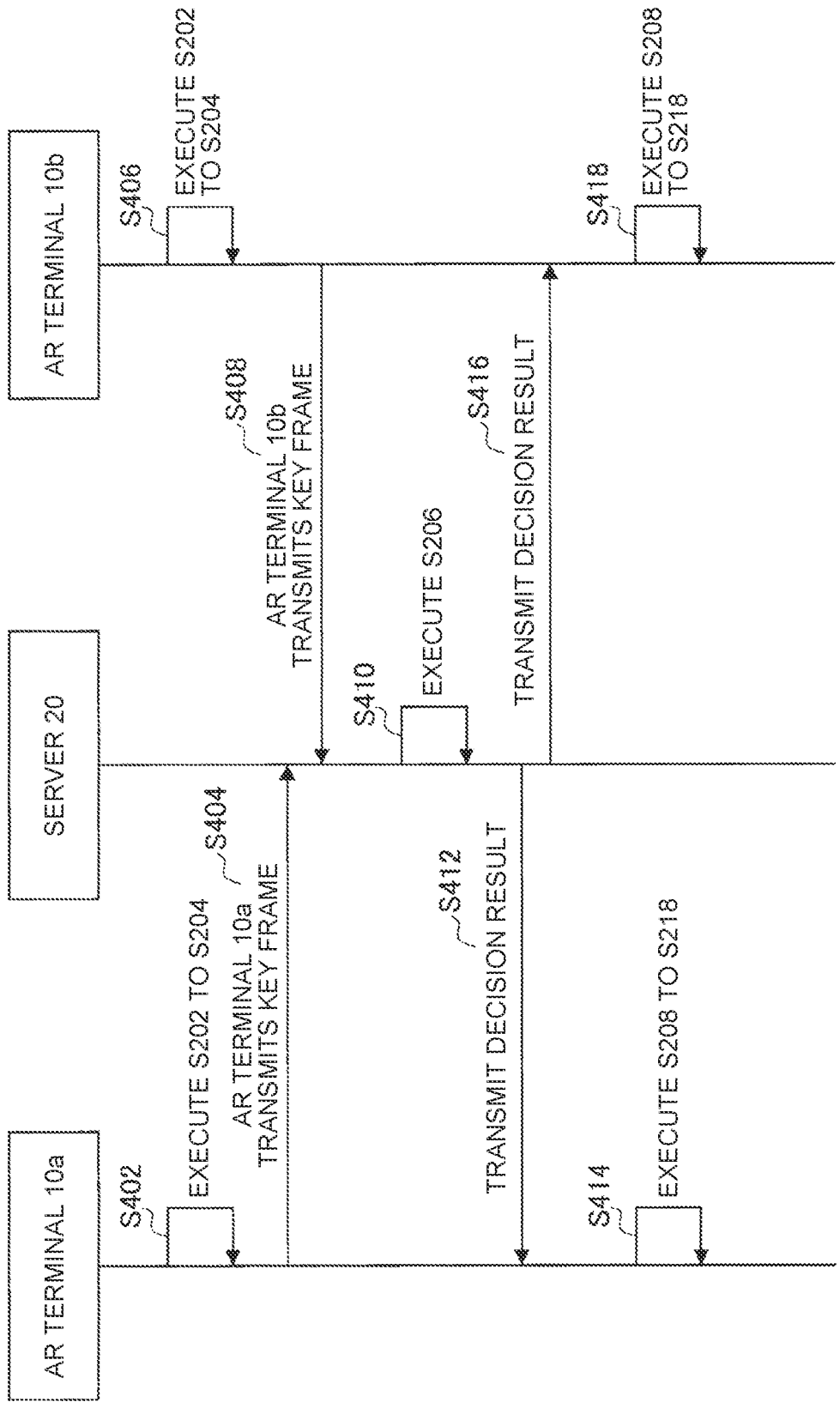

<USER 12a's VIEW (AT TIME t1)>  <USER 12b's VIEW (AT TIME t1)>

FIG.9B
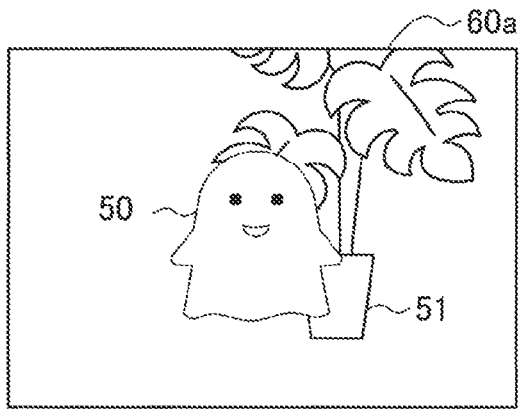
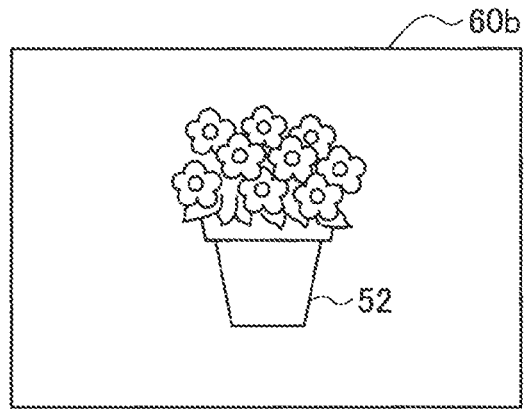
<USER 12a's VIEW (AT TIME t2)>    <USER 12b's VIEW (AT TIME t2)>

FIG. 10A
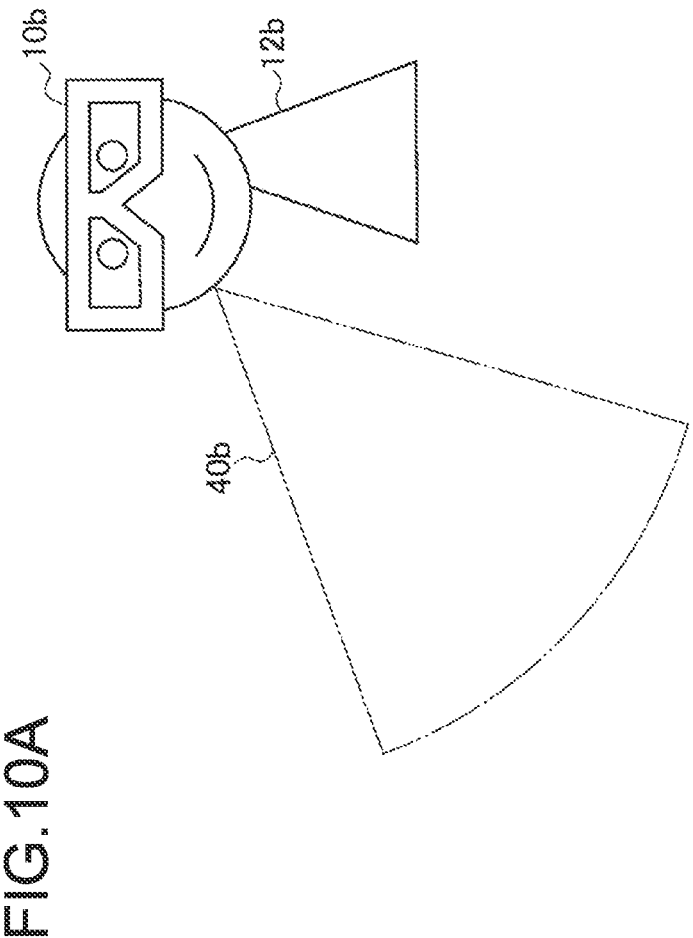
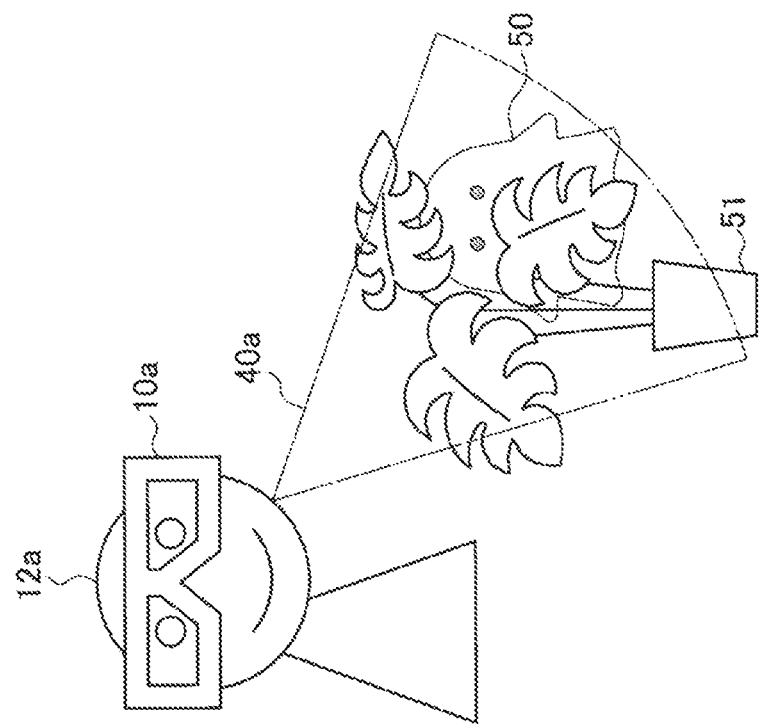

FIG.10B
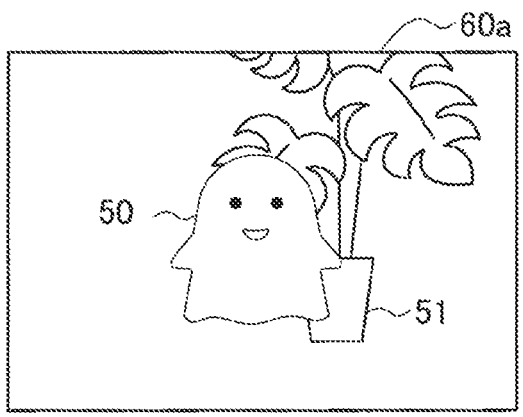
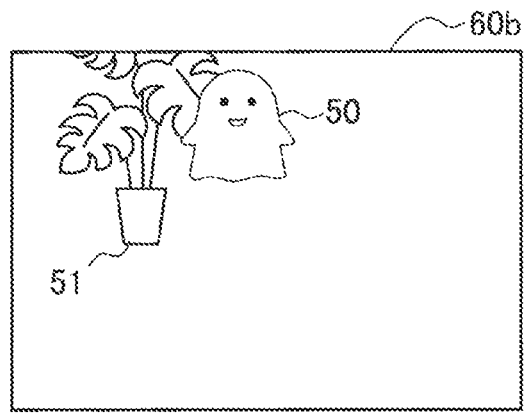
<USER 12a's VIEW (AT TIME t3)>     <USER 12b's VIEW (AT TIME t3)>

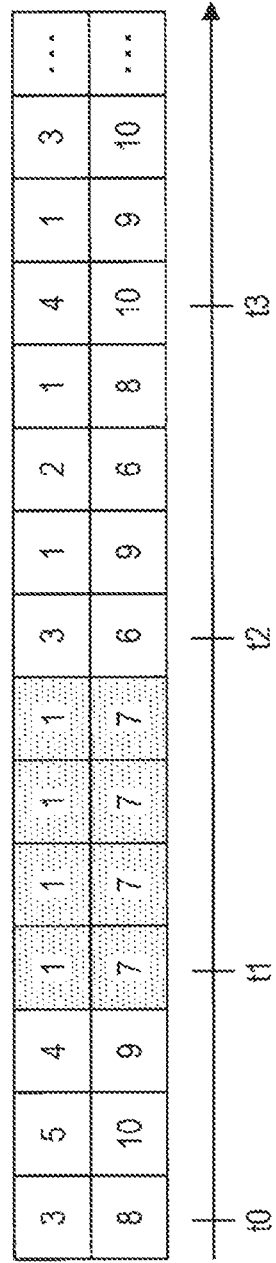

INFORMATION PROCESSING DEVICE, INFORMATION PROCESSING METHOD, AND RECORDING MEDIUM

CROSS REFERENCE TO PRIOR APPLICATION

This application is a National Stage Patent Application of PCT International Patent Application No. PCT/JP2020/015326 (filed on Apr. 3, 2020) under 35 U.S.C. § 371, which claims priority to Japanese Patent Application No. 2019-075688 (filed on Apr. 11, 2019), which are all hereby incorporated by reference in their entirety.

FIELD

The present disclosure relates to an information processing device, an information processing method, and a recording medium.

BACKGROUND

In recent years, there has been a technology attracting attention referred to as augmented reality (AR) in which additional information (hereinafter, also referred to as a virtual object) is superimposed on a real space and the result of superimposition is presented to a user. Information presentation utilizing the AR technology uses a display terminal such as a head mounted display (HMD). In some cases, a position in the global coordinate system is assigned to the presented virtual object. In this case, the display terminal estimates the self-position in the global coordinate system, and then determines the display position of the virtual object so that the virtual object is displayed at the position in the global coordinate system assigned to the virtual object.

Among various existing methods of estimating the self-position of the display terminal, Patent Literature 1 below discloses a method using a key frame-based simultaneous localization and mapping (SLAM) technology.

CITATION LIST

Patent Literature

Patent Literature 1: JP 2016-528476 A

SUMMARY

Technical Problem

The estimation result of the self-position of the display terminal can include an error. This might result in occurrence of an error between the position in the global coordinate system assigned to the virtual object and the position in the global coordinate system of the virtual object displayed by the display terminal. Here, when an identical virtual object is to be displayed on a plurality of display terminals, variation that occurs in self-position estimation accuracy and an estimation result for individual display terminals leads to a difference in the positions of the virtual objects in the global coordinate system displayed on the individual display terminals.

In view of this situation, the present disclosure proposes a novel and improved information processing device, information processing method, and recording medium capable of reducing the difference in the display position in a case where a plurality of display terminals displays an identical virtual object.

Solution to Problem

According to the present disclosure, an information processing device is provided that includes a control unit that controls a display terminal that arranges a virtual object in a real space by using a coordinate system associated with the real space, wherein the control unit determines whether to update first spatial information of a first display terminal and second spatial information of a second display terminal, which are used for determining a position of the virtual object, based on a first operation state of the first display terminal and a second operation state of the second display terminal that shares the virtual object with the first display terminal.

Moreover, according to the present disclosure, an information processing device is provided that includes: an output unit including a first output device that presents a virtual object to a first user; and a control unit that determines a position of the virtual object to be arranged in a coordinate system associated with a real space, wherein the control unit determines whether to update first spatial information of the first output device and second spatial information of the second output device, which are used for determining the position of the virtual object, based on a first operation state of the first output device and a second operation state of a second output device which is externally provided and shares the virtual object with the first output device.

Moreover, according to the present disclosure, an information processing method to be executed by a processor is provided that includes: controlling a display terminal that arranges a virtual object in a real space by using a coordinate system associated with the real space; and determining whether to update first spatial information of a first display terminal and second spatial information of a second display terminal, which are used for determining a position of the virtual object, based on a first operation state of the first display terminal and a second operation state of the second display terminal that shares the virtual object with the first display terminal.

Moreover, according to the present disclosure, a recording medium is provided that records a program that causes a computer to execute processes including: controlling a display terminal that arranges a virtual object in a real space by using a coordinate system associated with the real space; and determining whether to update first spatial information of a first display terminal and second spatial information of a second display terminal, which are used for determining a position of the virtual object, based on a first operation state of the first display terminal and a second operation state of the second display terminal that shares the virtual object with the first display terminal.

BRIEF DESCRIPTION OF DRAWINGS

FIG. 7 is a sequence diagram illustrating a flow of a process in the information processing system according to the embodiment.

FIG. 9B is a diagram illustrating individual user's views according to the second specific example of the embodiment.

FIG. 10A is a diagram illustrating a positional relationship among a plurality of users according to a third specific example of the embodiment.

FIG. 10B is a diagram illustrating individual user's views according to the third specific example of the embodiment.

FIG. 11 is a diagram illustrating time-series changes of key frames according to the fourth specific example of the embodiment.

DESCRIPTION OF EMBODIMENTS

Figure 1:
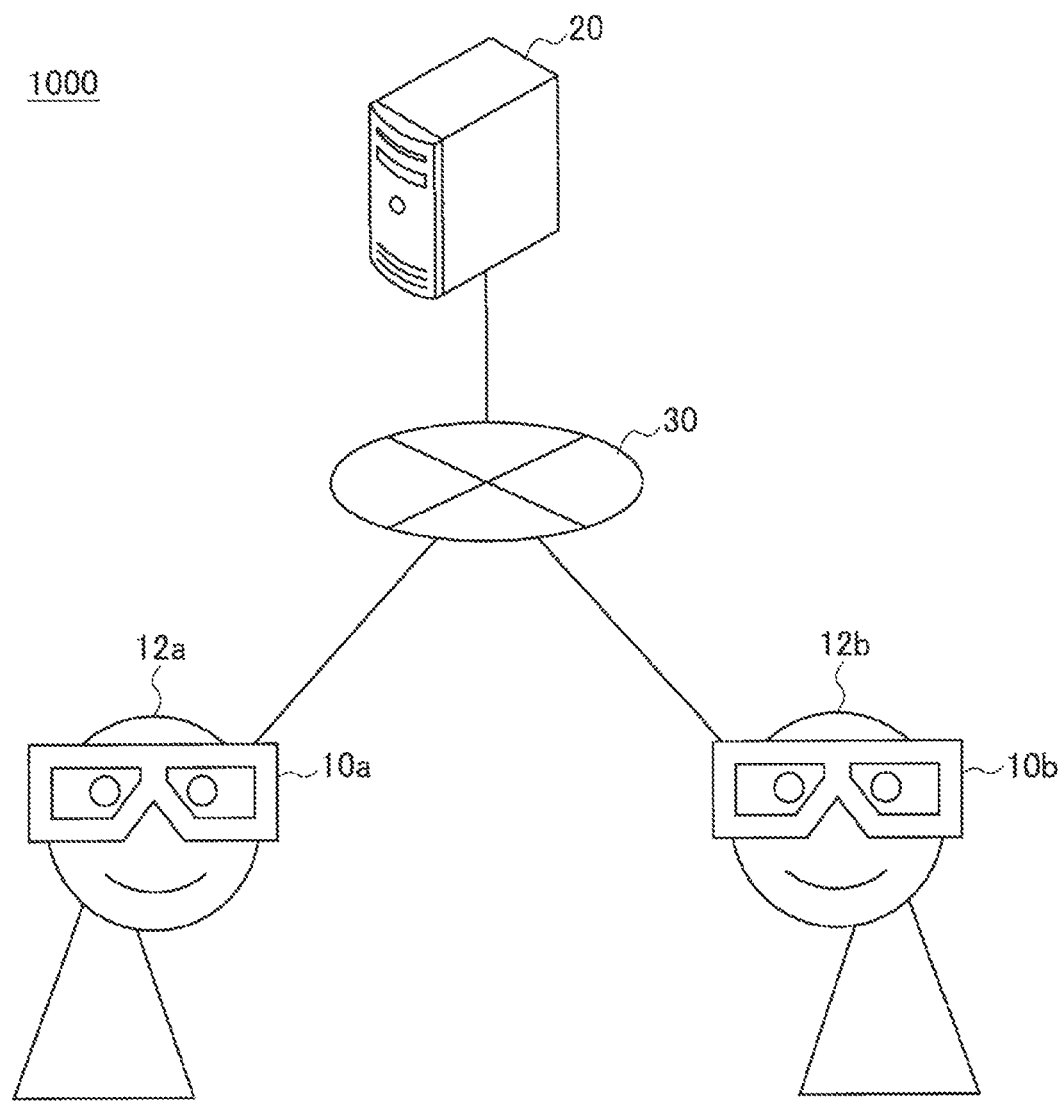
FIG. 1 is a diagram illustrating a system configuration example of an information processing system according to an embodiment of the present disclosure.

Hereinafter, preferred embodiments of the present disclosure will be described in detail with reference to the accompanying drawings. In the present specification and the drawings, components having substantially the same functional configuration will be denoted with the same reference numerals and redundant description will be omitted.

Note that the description will be provided in the following order.
1. First Embodiment
2. Second Embodiment
3. Hardware configuration example
4. Supplement 1. First Embodiment A technology according to an embodiment of the present disclosure relates to an information processing device that controls display of an identical virtual object on a plurality of display terminals. Hereinafter, as an example, it is assumed that the display terminal is actualized by an AR terminal and the information processing device is actualized by a server.

1-1. System Configuration Example

First, a system configuration example of an information processing system according to an embodiment of the present disclosure will be described with reference to FIGS. 1 and 2. FIG. 1 is a diagram illustrating a system configuration example of an information processing system according to the embodiment of the present disclosure. As illustrated in FIG. 1, an information processing system 1000 according to the present embodiment includes an AR terminal 10, a server 20, and a network 30. Note that, in the present embodiment, as illustrated in FIG. 1, it is assumed that a user 12a wears an AR terminal 10a (first display terminal) while a user 12b wears an AR terminal 10b (second display terminal). Furthermore, the AR terminal 10a and the AR terminal 10b perform shared display of an identical virtual object.

(1) AR Terminal 10

The AR terminal 10 is a terminal that displays a virtual object. The AR terminal 10 according to the present embodiment is actualized by, for example, a head mounted display (HMD) or the like. Examples of the HMD applicable to the AR terminal 10 include a see-through HMD, a video see-through HMD, and a retinal projection HMD.

The see-through HMD uses, for example, a semi-transparent mirror or a transparent light guide plate to hold a virtual image optical system formed with a transparent light guide unit or the like in front of the eyes of the user 12 so as to display an image inside the virtual image optical system. Therefore, the user 12 wearing a see-through HMD can view an external sight while viewing an image displayed inside the virtual image optical system. With such a configuration, the see-through HMD can also superimpose a virtual object image on the optical image of the real object located in the real space based on the AR technology in accordance with a recognition result of at least one of the position or the posture of the see-through HMD, for example. A specific example of the see-through HMD is a device referred to as an eye-glass type wearable device having a portion corresponding to the lens of the eye-glass configured as a virtual image optical system.

When worn on the head or the face of the user 12, the video see-through HMD is worn so as to cover the eyes of the user 12 to allow a display unit such as a display member to be held in front of the eyes of the user 12. Furthermore, the video see-through HMD includes an imaging unit for capturing an image of a surrounding sight, and causes a display unit to display an image of the sight in front of the user 12, captured by the imaging unit. With such a configuration, the user 12 wearing the video see-through HMD cannot easily have a direct view of the external sight, but still can confirm the external sight by the image displayed on the display unit. Furthermore, at this time, the video see-through HMD may superimpose a virtual object on an image of an external sight based on the AR technology in accordance with a recognition result of at least one of the position or the posture of the video see-through HMD, for example.

The retinal projection HMD has a configuration in which a projector is held in front of the eyes of the user 12, and an image is projected from the projector toward the eyes of the user 12 so that the image is superimposed on the external sight. More specifically, the retinal projection HMD directly projects an image from the projector onto the retina of the eye of the user 12 so as to allow the image to be formed on the retina. With such a configuration, even a near-sighted or far-sighted user 12 can view a clearer image. Furthermore, the user 12 wearing the retinal projection HMD can view the external sight while viewing the image projected from the projector. With such a configuration, the retinal projection HMD can also superimpose a virtual object image on the optical image of the real object located in the real space based on the AR technology in accordance with a recognition result of at least one of the position or the posture of the retinal projection HMD, for example.

Furthermore, other than the examples described above, there is a HMD referred to as an immersive HMD. Similarly to the video see-through HMD, the immersive HMD is worn so as to cover the eyes of the user 12 to allow a display unit such as a display member to be held in front of the eyes of the user 12. Therefore, it is difficult for the user 12 wearing the immersive HMD to directly view the external sight (that is, the sight of the real world), and only the image displayed on the display unit enters the visual field. With such a configuration, the immersive HMD can give a sense of immersion to the user 12 viewing the image. Therefore, the immersive HMD is applicable to a case where information is presented mainly based on a virtual reality (VR) technology, for example.

Note that the AR terminal 10 is not limited to the above-described HMD. For example, the AR terminal 10 may be a terminal device having a display unit, such as a smartphone, a tablet terminal, a wearable terminal, or an agent device.

The AR terminal 10 is connected to the server 20 via the network 30, and can transmit and receive information to and from the server 20.

(Hardware Configuration of AR Terminal 10)

Here, a hardware configuration example of the AR terminal 10 will be described with reference to FIG. 2. FIG. 2 is a block diagram illustrating a hardware configuration example of the AR terminal 10 according to the embodiment of the present disclosure. Note that the hardware configuration example of the AR terminal 10 is not limited to such an example.

Figure 2:
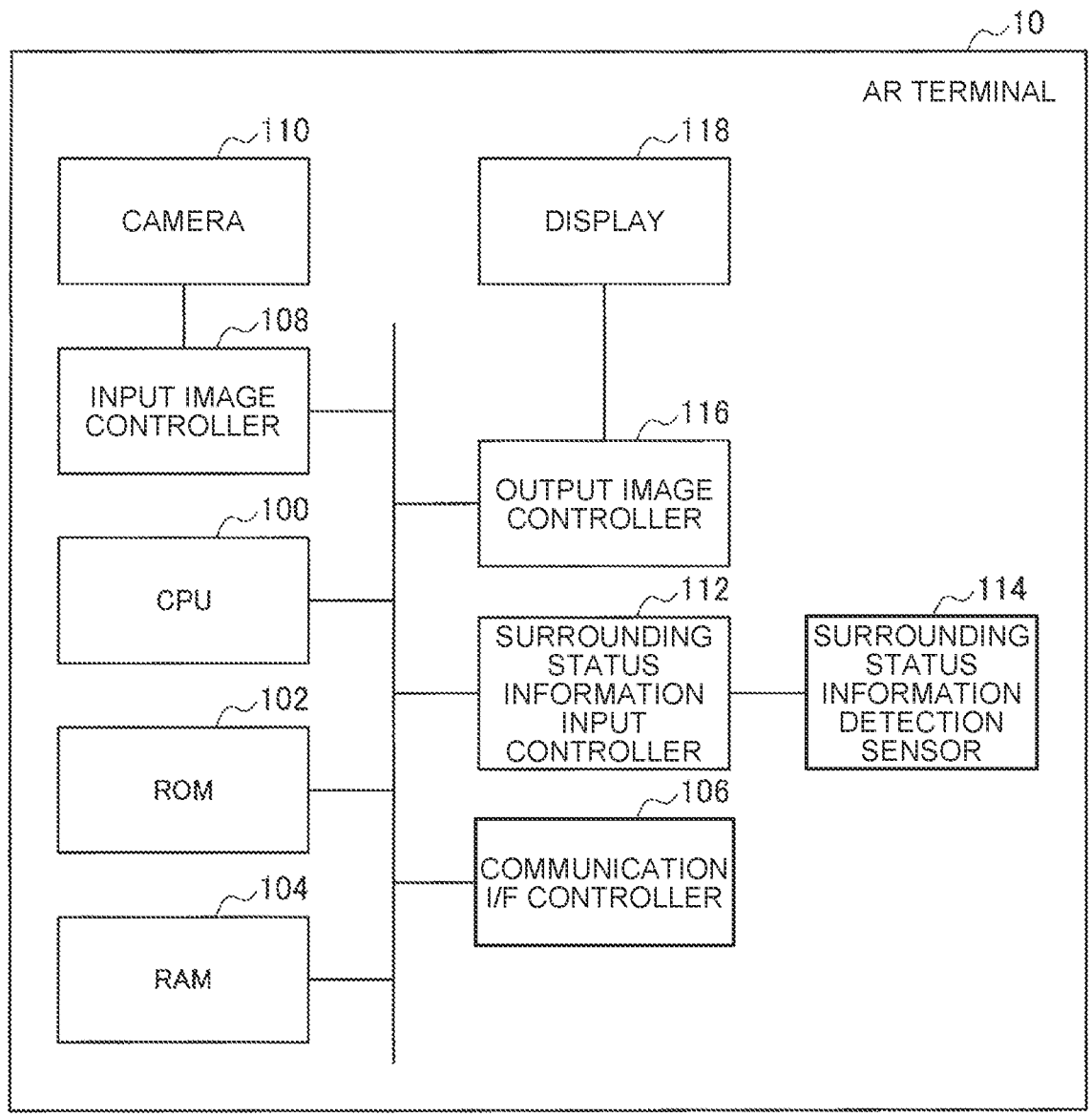
FIG. 2 is a block diagram illustrating a hardware configuration example of an AR terminal according to the embodiment.

As illustrated in FIG. 2, the AR terminal 10 includes a central processing unit (CPU) 100, read only memory (ROM) 102, and random access memory (RAM) 104. Furthermore, the AR terminal 10 includes a communication interface (I/F) controller 106, an input image controller 108, a camera 110, a surrounding status information input controller 112, a surrounding status information detection sensor 114, an output image controller 116, and a display 118.

The CPU 100 functions as, for example, an arithmetic processing device or a control device, and controls the entire or part of operation of each of components based on various programs recorded in the ROM 102, the RAM 104, or the storage device. The ROM 102 is a means to store programs loaded by the CPU 100, data used for calculation, or the like. The RAM 104 temporarily or permanently stores, for example, a program loaded by the CPU 100, various parameters that appropriately change when the program is executed, or the like.

The communication I/F controller 106 is a controller that performs control related to communication. For example, the communication I/F controller 106 controls communication with an external device via the network 30.

The input image controller 108 is a controller that performs control related to input of an image (a still image or a moving image). For example, input image controller 108 controls input of a photographic image captured by camera 110. Furthermore, the input image controller 108 may control an imaging process performed by the camera 110.

The camera 110 is an imaging device that images the surroundings of the AR terminal 10. With the imaging device, the AR terminal 10 can acquire a photographic image indicating the surroundings of the user 12. The number of cameras 110 provided in the AR terminal 10 is not particularly limited, and any number of cameras 110 may be provided. The AR terminal 10 according to the present embodiment is provided with a right-eye camera and a left-eye camera, for example.

The surrounding status information input controller 112 is a controller that performs control related to input of information indicating a state around the AR terminal 10 (hereinafter, also referred to as "surrounding status information"). For example, the surrounding status information input controller 112 controls the input of the surrounding status information acquired by the surrounding status information detection sensor 114. Furthermore, the surrounding status information input controller 112 may control a surrounding status information acquisition process performed by the surrounding status information detection sensor 114.

The surrounding status information detection sensor 114 is a sensor device that senses surrounding status information. The surrounding status information detection sensor 114 acquires, by a camera, for example, a photographic image indicating a status around the AR terminal 10 as surrounding status information. Note that the camera may be the camera 110 described above, or may be a camera different from the camera 110.

The output image controller 116 is a controller that performs control related to output of images. For example, the output image controller 116 controls output regarding the output image on the display 118. Furthermore, the output image controller 116 may control processes related to generation of an output image output by the display 118.

The display 118 is a device that outputs an output image. Examples of the display 118 include a CRT display device, a liquid crystal display device, a plasma display device, and an EL display device. Note that the number of displays 118 provided in the AR terminal 10 is not particularly limited, and any number of displays may be provided. The AR terminal 10 according to the present embodiment is provided with a right-eye display and a left-eye display, for example.

(2) Server 20

The server 20 is an information processing device having a function of controlling display of virtual objects in a plurality of the AR terminals 10. For example, the server 20 performs a decision process for controlling display of the virtual object in the AR terminal 10 based on the information indicating the operation state of the AR terminal 10. Specifically, the server 20 performs a process of determining whether to update a key frame (spatial information) used for determining the position of the virtual object based on the operation state (first operation state) of the AR terminal 10*a* and the operation state (second operation state) of the AR terminal 10*b*. Subsequently, the AR terminal 10 determines and displays the position of the virtual object while sequentially updating the key frame according to the determination made by the server 20. Hereinafter, the key frame used to determine the position of the virtual object will also be referred to as a "position determination key frame". Hereinafter, the process of determining whether to update the position determination key frame will also be referred to as a "key frame update decision process". In a case where the server 20 has decided to update the position determination key frame in the key frame update decision process, both the position determination key frame (first spatial information) of the AR terminal 10*a* and the position determination key frame (second spatial information) of the AR terminal 10*b* are to be updated.

The key frame can include a photographic image, a feature point of the photographic image, and information indicating the self-position of the camera when the photographic image is captured. For example, each time the camera 110 of the AR terminal 10 captures an image, the key frame is stored in a storage unit included in the AR terminal 10. Hereinafter, a plurality of key frames stored in the storage unit of the AR terminal 10 will be also referred to as a "key frame group".

Each of the plurality of AR terminals 10 acquires a candidate key frame to be used for updating the position determination key frame (hereinafter referred to as an "update destination candidate key frame") from among the key frame group. For example, the AR terminal 10a acquires an update destination candidate key frame (third spatial information) of the AR terminal 10a from among the key frame group of the AR terminal 10a. Moreover, the AR terminal 10b acquires an update destination candidate key frame (fourth spatial information) of the AR terminal 10b from among the key frame group of the AR terminal 10b. The server 20 receives the update destination candidate key frames acquired by each of the plurality of AR terminals 10 and then performs a key frame update decision process based on the received update destination candidate key frames.

The update destination candidate key frame is acquired by the AR terminal 10 based on the information indicating the operation state of the AR terminal 10. An example of the operation state of the AR terminal 10 is a posture of the AR terminal 10. The posture of the AR terminal 10 can also include information indicating the self-position of the AR terminal 10. An example of the information indicating the operation state is a photographic image acquired by the camera 110 included in the AR terminal 10. For example, the AR terminal 10 performs matching between the feature point of the photographic image captured immediately before the key frame update decision process and the feature point of the photographic image included in each of key frames of the key frame group, and then acquires the key frame successful in the matching, as the update destination candidate key frame.

The server 20 is connected to the AR terminal 10 via the network 30, and can transmit and receive information to and from the AR terminal 10. For example, the server 20 receives the update destination candidate key frames from the AR terminal 10a and the AR terminal 10b. Furthermore, the server 20 transmits the decision result obtained in the decision process to the AR terminal 10a and the AR terminal 10b.

(3) Network 30

The network 30 has a function of connecting the AR terminal 10 and the server 20 with each other. Furthermore, the network 30 may have a function of connecting a plurality of AR terminals 10 to each other. For example, the network 30 connects the AR terminal 10a and the AR terminal 10b to each other.

The network 30 may include a public network such as the Internet, a telephone network, and a satellite communication network, or various local area networks (LANs) including Ethernet (registered trademark), wide area networks (WANs), or the like. Furthermore, the network 30 may include a dedicated network such as an Internet protocol-virtual private network (IP-VPN). The network 30 may further include a wireless communication network such as Wi-Fi (registered trademark) or Bluetooth (registered trademark).

1-2. Functional Configuration Example

Figure 3:
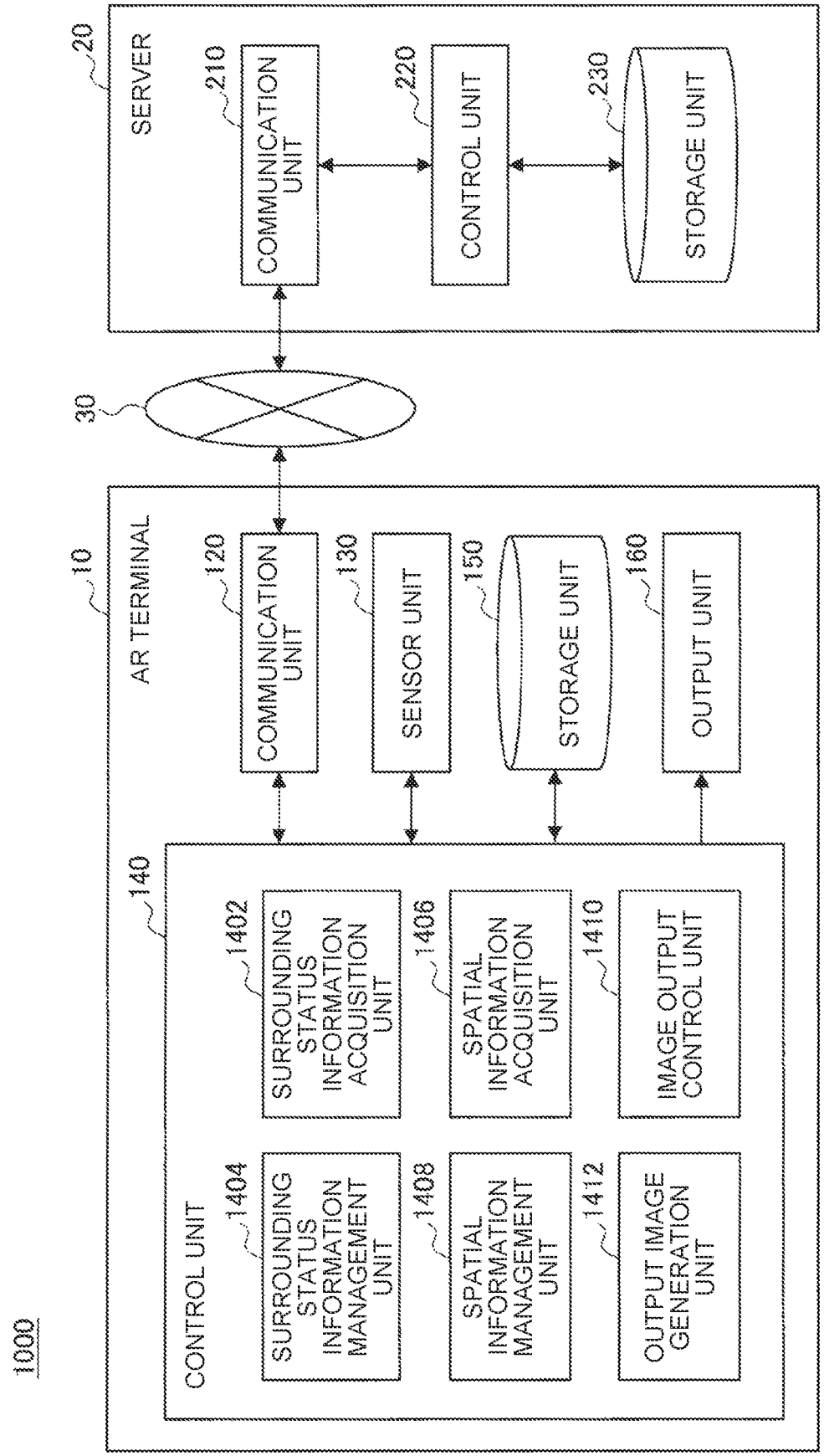
FIG. 3 is a block diagram illustrating a functional configuration example of an information processing system according to the embodiment.

The system configuration example according to the present embodiment has been described as above. Next, a functional configuration example of the information processing system 1000 according to the embodiment of the present disclosure will be described with reference to FIG. 3. FIG. 3 is a block diagram illustrating a functional configuration example of the information processing system 1000 according to the embodiment of the present disclosure.

<1-2-1. Functional Configuration of AR Terminal>

As illustrated in FIG. 3, the AR terminal 10 according to the present embodiment includes a communication unit 120, a sensor unit 130, a control unit 140, a storage unit 150, and an output unit 160.

(1) Communication Unit 120

The communication unit 120 has a function of communicating with an external device. For example, in communication with an external device, the communication unit 120 outputs information received from the external device to the control unit 140. As an example, the communication unit 120 receives a decision result from the server 20 in communication with the server 20 via the network 30, and then outputs the decision result to the control unit 140.

For example, in communication with an external device, the communication unit 120 transmits information input from the control unit 140 to the external device. As an example, the communication unit 120 transmits the update destination candidate key frame to the server 20.

(2) Sensor Unit 130

The sensor unit 130 has a function of sensing information used for the processes in the control unit 140. After sensing, the sensor unit 130 outputs sensing information acquired by various sensors by sensing to the control unit 140.

The sensor unit 130 can include various sensor devices. As an example, the sensor unit 130 can include a camera, a depth sensor, an acceleration sensor, a gyro sensor, or the like. The sensor device included in the sensor unit 130 is not limited to the above-described example, and any other sensor device may be included.

The camera is an imaging device such as an RGB camera, which includes a lens system, a drive system, and an imaging element and captures an image as a photographic image. Such an imaging device can be included in the AR terminal 10 so as to be able to capture surrounding images of the AR terminal 10. With such a configuration, the sensor unit 130 can acquire a photographic image around the AR terminal 10. Note that, in a case where the user 12 wears or carries the AR terminal 10, the photographic images of the surroundings of the AR terminal 10 acquired by the sensor unit 130 are also the photographic images of the surroundings of the user 12.

The depth sensor is a device that acquires depth information, such as an infrared distance measuring device, an ultrasonic distance measuring device, laser imaging detection and ranging (LiDAR), or a stereo camera. The sensor unit 130 can acquire the position information of the AR terminal 10 based on the information acquired by the depth sensor. In a case where the user 12 wears or carries the AR terminal 10, the position information of the AR terminal 10 acquired by the sensor unit 130 is also the position information of the user 12.

The acceleration sensor is a device that acquires acceleration. For example, the acceleration sensor measures acceleration, which is the rate of change in speed in the movement of the target. The gyro sensor is a device that acquires an angular velocity. For example, the gyro sensor measures an angular velocity which is a change amount of a posture of the target. Hereinafter, the information acquired by the acceleration sensor and the gyro sensor will also be referred to as "inertial information". With such a configuration, the sensor unit 130 can acquire inertial information of the AR terminal 10. In a case where the user 12 wears or carries the AR terminal 10, the inertial information acquired by the sensor unit 130 is also inertial information of the user 12.

(3) Control Unit 140

The control unit 140 has a function of controlling the entire operation of the AR terminal 10. In order to implement the function, as illustrated in FIG. 3, the control unit 140 includes a surrounding status information acquisition unit 1402, a surrounding status information management unit 1404, a spatial information acquisition unit 1406, a spatial information management unit 1408, an image output control unit 1410, and an output image generation unit 1412.

(3-1) Surrounding Status Information Acquisition Unit 1402

The surrounding status information acquisition unit 1402 has a function of controlling acquisition of the surrounding status information regarding the AR terminal 10. For example, the surrounding status information acquisition unit 1402 controls the operation of the sensor unit 130 and causes the sensor unit 130 to acquire the surrounding status information. Furthermore, the surrounding status information acquisition unit 1402 may control the operation of the communication unit 120 and may acquire the surrounding status information from an external device connected to the AR terminal 10 via the communication unit 120. Examples of the external device include a sensor device, the server 20, or the like, installed outside the AR terminal 10.

(3-2) Surrounding Status Information Management Unit 1404

The surrounding status information management unit 1404 has a function of managing surrounding status information. For example, the surrounding status information management unit 1404 performs an update process of a database (hereinafter, also referred to as a "surrounding status information DB") that stores surrounding status information, included in the storage unit 150. As an example, the surrounding status information management unit 1404 causes the storage unit 150 to add the surrounding status information acquired by the surrounding status information acquisition unit 1402 to the surrounding status information DB.

(3-3) Spatial Information Acquisition Unit 1406

The spatial information acquisition unit 1406 has a function of controlling acquisition of information related to spatial information of the AR terminal 10. For example, the spatial information acquisition unit 1406 controls the operation of the sensor unit 130 and causes the sensor unit 130 to acquire information related to spatial information. As an example, the spatial information acquisition unit 1406 controls a camera provided in the sensor unit 130 to capture a photographic image indicating the operation state of the AR terminal 10.

(3-4) Spatial Information Management Unit 1408

The spatial information management unit 1408 has a function of managing spatial information. For example, the spatial information management unit 1408 controls processes related to spatial information. As an example, the spatial information management unit 1408 performs processes such as generation of a query image, acquisition of an update destination candidate key frame, update of a position determination key frame, initial pose estimation, and final pose estimation.

(Generation of Query Image)

The spatial information management unit 1408 performs processes related to generation of a query image. For example, the spatial information management unit 1408 generates a query image based on the photographic image acquired by the spatial information acquisition unit 1406. The query image is used at acquisition of the update destination candidate key frame from the key frame group.

At the time of generating the query image, the spatial information management unit 1408 estimates the self-position of the camera at the time of imaging (self-position of the AR terminal 10) based on the photographic image. Furthermore, the spatial information management unit 1408 performs feature point detection and feature amount description on the photographic image, and then acquires a two-dimensional feature point.

(Acquisition of Update Destination Candidate Key Frame)

The spatial information management unit 1408 acquires an update destination candidate key frame of the AR terminal 10 based on the operation state of the AR terminal 10. For example, the spatial information management unit 1408 uses the query image generated from the photographic image indicating the operation state of the AR terminal 10 captured by the camera of the sensor unit 130, thereby searching for the update destination candidate key frame from the key frame group stored in the storage unit 150. When searching for the update destination candidate key frame, the spatial information management unit 1408 performs matching between the two-dimensional feature point acquired at the time of generating the query image and the two-dimensional feature point included in individual key frames of the key frame group. The spatial information management unit 1408 then acquires a key frame having two-dimensional feature point successful in the matching, as an update destination candidate key frame.

(Update of Position Determination Key Frame)

The spatial information management unit 1408 performs an update process of the position determination key frame based on the decision result of the key frame update decision process in the server 20. When the key frame update decision process has decided to update the position determination key frame, the spatial information management unit 1408 will update the position determination key frame by using the update destination candidate key frame. In contrast, when the key frame update decision process has decided not to update the position determination key frame, the spatial information management unit 1408 will not update the position determination key frame.

(Initial Pose Estimation)

The spatial information management unit 1408 estimates the initial pose of the AR terminal 10 based on the position determination key frame. The pose indicates the position and posture of the AR terminal 10. Furthermore, the initial pose indicates the position and posture of the AR terminal 10 when the camera captured a photographic image. For example, the spatial information management unit 1408 estimates the initial pose of the AR terminal 10 from the information indicating the self-position associated with the position determination key frame.

At this time, the spatial information management unit 1408 performs feature point matching between the two-dimensional feature point of the photographic image captured by the camera of the sensor unit 130 and the two-dimensional feature point of the position determination key frame. When the feature point matching is successful, the spatial information management unit 1408 uses the information indicating the self-position included in the position determination key frame as the initial pose of the AR terminal 10. When the feature point matching is not successful, the spatial information management unit 1408 updates the position determination key frame and repeats the feature point matching until the feature point matching is successful.

(Final Pose Estimation)

The spatial information management unit 1408 corrects the estimated initial pose, thereby estimating the final pose of the AR terminal 10. The final pose indicates the position and posture of the AR terminal 10 at the current time. Regarding the final pose, for example, the spatial information management unit 1408 performs image matching between the photographic image captured by the camera of the sensor unit 130 and the photographic image included in the position determination key frame. When a difference between both images has been detected as a result of the image matching, the spatial information management unit 1408 corrects the initial pose based on the difference and determines the corrected pose as the final pose of the AR terminal 10.

(3-5) Image Output Control Unit 1410

The image output control unit 1410 has a function of controlling output of an image. For example, the image output control unit 1410 causes the output unit 160 to output an output image generated by the output image generation unit 1412. In a case where the AR terminal 10 is provided with a right-eye display and a left-eye display, the image output control unit 1410 causes each of the displays to output an output image in a format corresponding to each of the displays.

(3-6) Output Image Generation Unit 1412

The output image generation unit 1412 has a function of generating an image. For example, the output image generation unit 1412 generates an output image to be output by the output unit 160. For example, based on the final pose of the AR terminal 10 estimated by the spatial information management unit 1408, the output image generation unit 1412 generates an output image in which a virtual object is arranged.

(4) Storage Unit 150

The storage unit 150 has a function of storing information related to processes in the AR terminal 10. For example, the storage unit 150 stores the surrounding status information acquired by the surrounding status information acquisition unit 1402 into the surrounding status information DB under the control of the surrounding status information management unit 1404. In addition, the storage unit 150 stores a map DB (key frame group) prepared in advance, into the spatial information DB.

Note that the information to be stored in the storage unit 150 is not limited to such an example. For example, the storage unit 150 may store programs such as various applications.

(5) Output Unit 160

The output unit 160 has a function of outputting an image. For example, under the control of the image output control unit 1410, the output unit 160 outputs the output image generated by the output image generation unit 1412.

<1-2-2. Functional Configuration of Server>

As illustrated in FIG. 3, the server 20 according to the present embodiment includes a communication unit 210, a control unit 220, and a storage unit 230.

(1) Communication Unit 210

The communication unit 210 has a function of communicating with an external device. For example, in communication with an external device, the communication unit 210 outputs information received from the external device to the control unit 220. As an example, in communication with the AR terminal 10 via the network 30, the communication unit 210 receives an update destination candidate key frames from the AR terminal 10 and outputs the received update destination candidate key frames to the control unit 220.

For example, in communication with an external device, the communication unit 210 transmits information input from the control unit 220 to the external device. As an example, the communication unit 210 transmits the decision result to the AR terminal 10.

(2) Control Unit 220

The control unit 220 is an information processing device having a function of controlling the entire operation of the server 20. For example, the control unit 220 has a function of performing processes related to the control of arrangement of virtual objects in the AR terminal 10. As an example of the process, the control unit 220 performs the key frame update decision process.

(Key Frame Update Decision Process)

In the key frame update decision process, the control unit 220 determines whether to update the position determination key frame of the AR terminal 10*a* and the position determination key frame of the AR terminal 10*b* based on the operation state of the AR terminal 10*a* and the operation state of the AR terminal 10*b*. Whether to update the position determination key frame of the AR terminal 10*a* and the position determination key frame of the AR terminal 10*b* is determined based on whether the operation state of the AR terminal 10*a* the operation state of the AR terminal 10*b* are similar.

The similarity in the operation states indicates the similarity in the viewing directions of the user 12*a* and the user 12*b*. Accordingly, when the operation state of the AR terminal 10*a* and the operation state of the AR terminal 10*b* are similar, the control unit 220 determines not to update the position determination key frame of the AR terminal 10*a* or the position determination key frame of the AR terminal 10*b*. By not updating the key frames, it would be possible to allow the AR terminal 10*a* and the AR terminal 10*b* to continuously use, while the operation states are similar, at least the position determination key frames (precisely, key frames obtained in similar operation states). This makes it possible to reduce the variation in self-position estimation accuracy and self-position estimation result for each of the AR terminals 10, and together with this, possible to reduce the difference in the display position of the identical virtual object among the plurality of AR terminals 10.

In contrast, dissimilarity in the operation states indicates the dissimilarity in the viewing directions of the user 12*a* and the user 12*b*. Accordingly, when the operation state of the AR terminal 10*a* and the operation state of the AR terminal 10*b* are dissimilar, the control unit 220 determines to update the position determination key frame of the AR terminal 10*a* and the position determination key frame of the AR terminal 10*b*. With such a configuration, it is possible to display, for each of users, a virtual object at a position corresponding to the viewing direction of each of the users.

Decision Based on Similarity Level

Whether the operation state of the AR terminal 10*a* and the operation state of the AR terminal 10*b* are similar is determined based on a result of comparison of a similarity level in the operation state of the AR terminal 10*a* and the operation state of the AR terminal 10*b* calculated by the control unit 220, with a first threshold. When the similarity level is the first threshold or more, the control unit 220 decides that the operation state of the AR terminal 10*a* and the operation state of the AR terminal 10*b* are similar. In contrast, when the similarity level is not the first threshold or more, the control unit 220 decides that the operation state of the AR terminal 10a and the operation state of the AR terminal 10b are dissimilar.

The control unit 220 calculates the similarity level based on the position determination key frame acquired by the AR terminal 10a in the operation state of the AR terminal 10a and the position determination key frame acquired by the AR terminal 10b in the operation state of the AR terminal 10b. Specifically, the control unit 220 performs feature point matching between the feature point included in the position determination key frame acquired by the AR terminal 10a and the feature point included in the position determination key frame acquired by the AR terminal 10b, and then calculates the similarity level based on the number of feature points successful in the matching. For example, the control unit 220 calculates a score as a specific value indicating the similarity level. As an example, the control unit 220 calculates the number of feature points successful in the matching, as the score.

Note that the method of calculating the similarity level is not limited to such an example. For example, the matching level of a position and posture matrix (3×4 matrix) in a three-dimensional coordinate system of the camera corresponding to the update destination candidate key frame may be calculated as the similarity level. Note that the matching level of the matrix is a sum of squares of each element of the matrix.

In addition, the value set as the first threshold is not particularly limited, and any value may be set. For example, when it is desired to further reduce the difference in display positions in a case where a plurality of AR terminals displays an identical virtual object, the first threshold is desirably set to be high.

In addition, the first threshold may be dynamically changed. For example, the control unit 220 changes the first threshold according to the positional relationship between the AR terminal 10a and the AR terminal 10b, that is, the positional relationship between the user 12a and the user 12b.

In a case where the user 12a and the user 12b are in a close positional relationship, it can be highly likely to perceive the difference in the display positions of the virtual object. Therefore, in a case where the user 12a and the user 12b are at close positions, the control unit 220 may set the first threshold high. With this setting, since the difference in the display positions is reduced, the device at the display position of the virtual object can be less likely to be perceived by the user 12a and the user 12b.

In contrast, in a case where the user 12a and the user 12b are in a distant positional relationship, it can be less likely to perceive a difference in the display position of the virtual object. Therefore, in a case where the user 12a and the user 12b are in a distant positional relationship, the control unit 220 may set the first threshold low. With this setting, although the difference in display position increases, it is possible to maintain a state in which the device at the display position of the virtual object is less likely to be perceived by the user 12a and the user 12b.

Decision of Maximum Value of Similarity Level

Whether to update the position determination key frame in the key frame update decision process may be determined based on whether the score of the similarity level is the maximum value. For example, the control unit 220 further determines whether to update the position determination key frame of the AR terminal 10a and the position determination key frame of the AR terminal 10b based on whether the similarity level exceeds the maximum value (third threshold).

The maximum value is a maximum value of the similarity level calculated in a period in which a predetermined condition is satisfied. The predetermined period is, for example, an organization in which it is continuously decided not to update the position determination key frame in a moving distance decision described below.

When the similarity level exceeds the maximum value as a result of the decision, the control unit 220 determines to update the position determination key frame of the AR terminal 10a and the position determination key frame of the AR terminal 10b. When the similarity level does not exceed the maximum value, the control unit 220 determines not to update the position determination key frame of the AR terminal 10a or the position determination key frame of the AR terminal 10b.

The state in which the similarity level of the update destination candidate key frame is the maximum value indicates that the similarity level of the update destination candidate key frame is higher than the similarity level of the currently used position determination key frame. Accordingly, by updating the currently used position determination key frame by using the update destination candidate key frame having the maximum similarity level, it is possible to reduce the difference in the display positions of the virtual object.

Decision of Moving Distance

In the key frame update decision process, whether to update the position determination key frame may be determined based on a moving distance of the AR terminal 10 after the last update of the position determination key frame. For example, the control unit 220 calculates a moving distance of the AR terminal 10a after the last update of the position determination key frame of the AR terminal 10a and a moving distance of the AR terminal 10b after the last update of the position determination key frame of the AR terminal 10b.

Note that the moving distance is a distance of a straight line connecting the position at the last update of the position determination key frame and the position where the current key frame update decision process is being performed. The moving distance can be calculated, for example, based on a difference between the self-position of the AR terminal 10 at the last update of the position determination key frame and the self-position of the AR terminal 10 at the time when the current key frame update decision process is being performed. Therefore, the control unit 220 acquires the self-position of the AR terminal 10 at the update of the position determination key frame and holds the self-position in the storage unit 230.

After calculating the moving distance, the control unit 220 compares the calculated moving distance with a second threshold, and determines whether to update the position determination key frame based on a result of the comparison.

For example, when at least one moving distance, out of the moving distances of the AR terminal 10a and the AR terminal 10b, is the second threshold or more, the control unit 220 determines to update the position determination key frame of the AR terminal 10a and the position determination key frame of the AR terminal 10b. In contrast, in a case where all the moving distances, out of the moving distances of the AR terminal 10a and the AR terminal 10b, are not the second threshold or more, the control unit 220 determines not to update the position determination key frame of the AR terminal 10a or the position determination key frame of the AR terminal 10b.

Note that, in a case where the moving distance of at least one AR terminal 10 among the plurality of AR terminals 10 is the second threshold or more, the control unit 220 determines to update the position determination key frames of all the AR terminals 10.

In addition, when comparing the result of the decision process based on the similarity level and the result of the decision process based on the moving distance, the result of the decision process based on the moving distance can be more highly prioritized. For example, even when it is decided in the decision process based on the similarity level that the update destination candidate key frames of the plurality of AR terminals 10 are similar, the control unit 220 would decide to update the position determination key frame when it is decided in the decision process based on the moving distance that the moving distance is the second threshold or more.

This is because there is a possibility that an error occurs in the self-position estimation of the AR terminal 10 due to the movement of the AR terminal 10 by a predetermined distance or more. Even when the update destination candidate key frames of the plurality of AR terminals 10 are similar, there is a possibility that the display positions of the virtual object have a difference due to the error.

Note that, the self-position estimation in the AR terminal uses a tracking process by the SLAM, for example. The tracking process calculates the moving distance of the AR terminal 10 based on the coordinate position of the camera corresponding to the key frame and the moving distance calculated based on the measurement value of the sensor such as an inertial measurement device. When the moving distance of the AR terminal 10 is the second threshold or more, there is a high possibility that the self-position estimation result of the AR terminal 10 is highly dependent on a moving distance portion calculated based on the measurement value of a sensor such as an inertial measurement device. Furthermore, there is a high possibility that a large amount of drift error is included to the estimation result.

Accordingly, in a case where the moving distance of at least one AR terminal 10 among the plurality of AR terminals 10 is the second threshold or more, the control unit 220 determines to update the position determination key frames of all the AR terminals 10. Furthermore, even when it is decided that the update destination candidate key frames of the plurality of AR terminals 10 are similar in the decision process based on the similarity level, the control unit 220 determines whether to update the position determination key frame according to the result of the decision process based on the moving distance. This configuration makes it possible to reduce the difference in the display positions of the virtual object.

(3) Storage Unit 230

The storage unit 230 has a function of storing information related to processes in the server 20. For example, the storage unit 230 stores the maximum value of the score calculated by the control unit 220. Furthermore, the storage unit 230 stores programs such as various applications, data, or the like. Note that the data stored in the storage unit 230 is not limited to the above example.

1-3. Process Examples

The functional configuration example according to the present embodiment has been described as above. Next, a processing example in the information processing system 1000 according to the embodiment of the present disclosure will be described with reference to FIGS. 4 to 7.

(1) Localization Process

Figure 4:
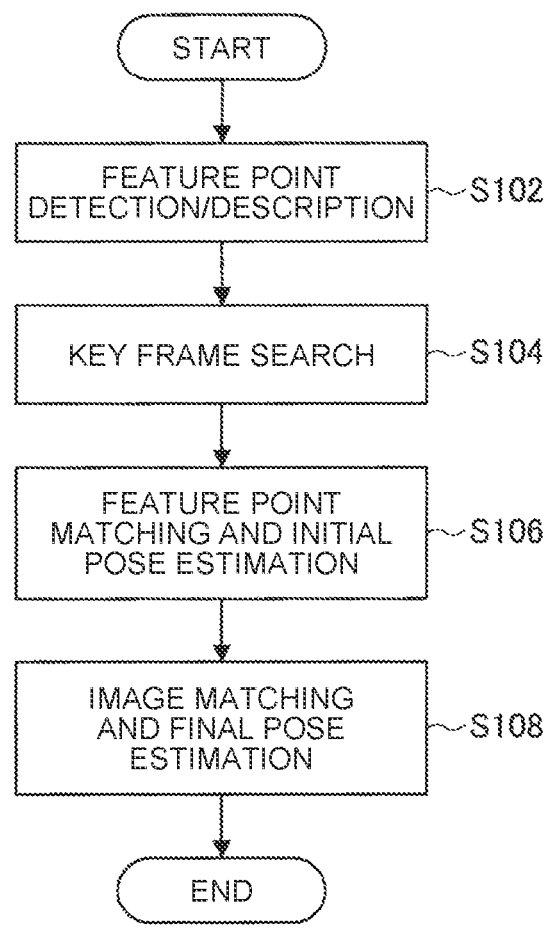
FIG. 4 is a flowchart illustrating a flow of a standard localization process.
Figure 5:
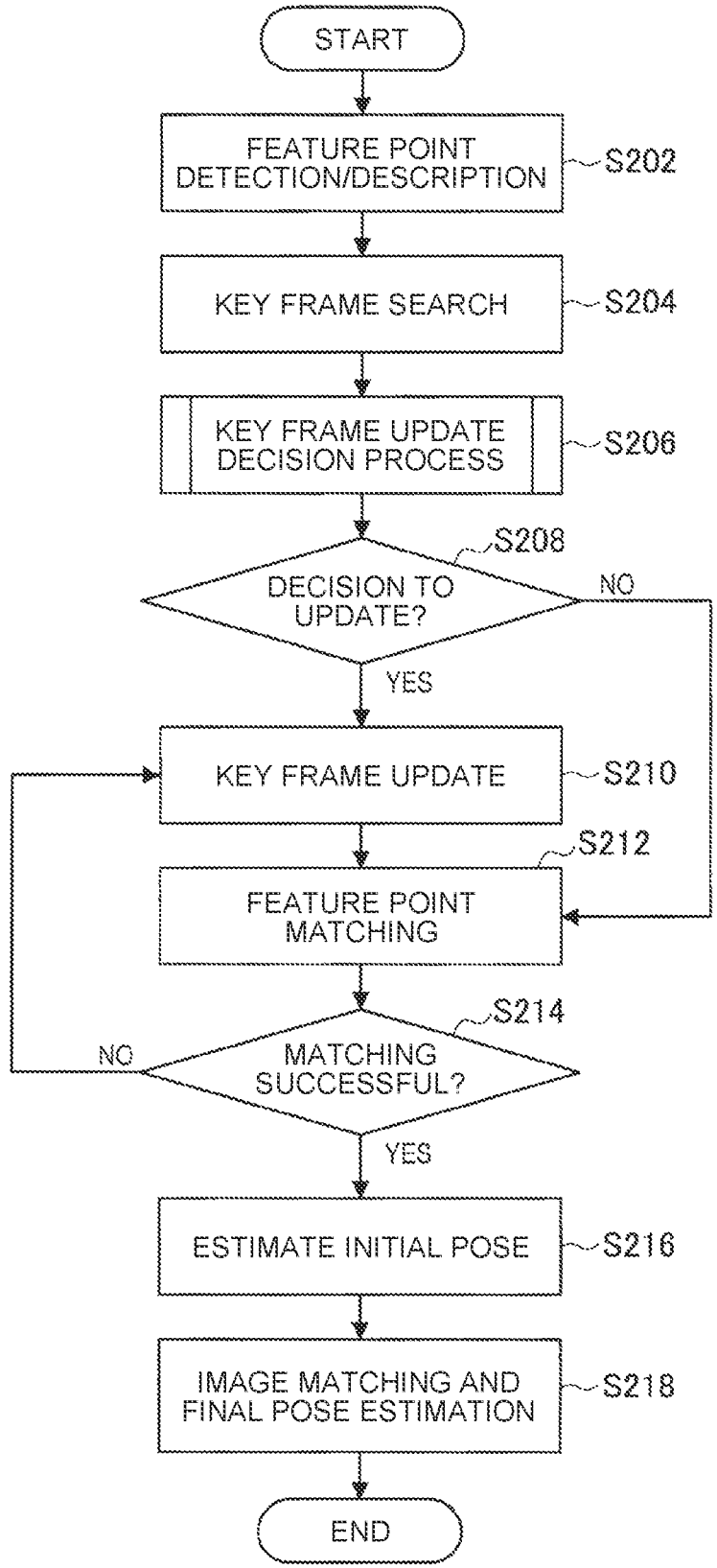
FIG. 5 is a flowchart illustrating a flow of a localization process according to the embodiment of the present disclosure.

First, a localization process will be described with reference to FIGS. 4 and 5. FIG. 4 is a flowchart illustrating a flow of a standard localization process. FIG. 5 is a flowchart illustrating a flow of a localization process according to the embodiment of the present disclosure. Note that the standard localization processing is supposed to be performed by a standard AR terminal. Furthermore, the localization process according to the present embodiment is supposed to be performed by the AR terminal 10 according to the present embodiment.

(1-1) Standard Localization Process

As illustrated in FIG. 4, the standard AR terminal initially performs feature point detection and feature amount description on a photographic image, and then acquires a two-dimensional feature point (S102). Next, the standard AR terminal searches for a key frame using the acquired two-dimensional feature point on the key frame group of the map DB stored in the storage unit of the standard AR terminal, and thereby acquires a key frame to be used for generation of an output image (S104). Next, the standard AR terminal performs feature point matching between the acquired feature points of the key frame and the feature points of the photographic image, and then estimates an initial pose of the standard AR terminal (S106). Subsequently, the standard AR terminal performs image matching between the acquired key frame and the photographic image, and then estimates the final pose of the standard AR terminal (S108).

In the standard localization process described above, one standard AR terminal does not share information such as a key frame with another standard AR terminal. Therefore, the standard AR terminal does not perform the determination of the display position of the virtual object which takes into consideration the positional relationship with another standard AR terminal.

(1-2) Localization Process According to Present Embodiment

As illustrated in FIG. 5, the AR terminal 10 first performs feature point detection and feature amount description on a photographic image, and then acquires a two-dimensional feature point (S202). Next, the AR terminal 10 searches for a key frame using the acquired two-dimensional feature point on the key frame group of the map DB stored in the storage unit 150 of the AR terminal 10, and acquires an update destination candidate key frame (S204). Next, the AR terminal 10 transmits the update destination candidate key frame to the server 20, and causes the server 20 to perform the key frame update decision process (S206). Note that details of the key frame update decision process will be described below.

After the key frame update decision process, the AR terminal 10 confirms whether it has been decided in the decision process to update the position determination key frame (S208). When it is decided in the decision process to update the position determination key frame (S208/YES), the AR terminal 10 updates the position determination key frame (S210) and proceeds to the process of S212. When it is decided in the decision process not to update the position determination key frame (S208/NO), the AR terminal 10 proceeds to the process of S212 without updating the position determination key frame.

In S212, the AR terminal 10 performs feature point matching between the feature point of the position determination key frame and the feature point of the photographic image (S212). After the feature point matching, the AR terminal 10 confirms whether the feature points are successful in the matching (S214).

When the feature points have not achieved matching (S214/NO), the AR terminal 10 repeats the processes from S210. When the feature points are successful in the matching (S214/YES), the AR terminal 10 estimates the initial pose of the AR terminal 10 (S216). Subsequently, the AR terminal 10 performs image matching between the position determination key frame and the photographic image, and estimates the final pose of the AR terminal 10 (S218).

In the localization process according to the present embodiment described above, the AR terminal 10 shares a key frame with another AR terminal 10 on the server 20. In addition, the AR terminal 10 determines the display position of the virtual object in consideration of the positional relationship with another standard AR terminal based on the result of the key frame update decision process performed by the server 20. With such a configuration, it is possible to reduce the difference in display positions when a plurality of AR terminals displays an identical virtual object.

(2) Key Frame Update Decision Process

Figure 6:
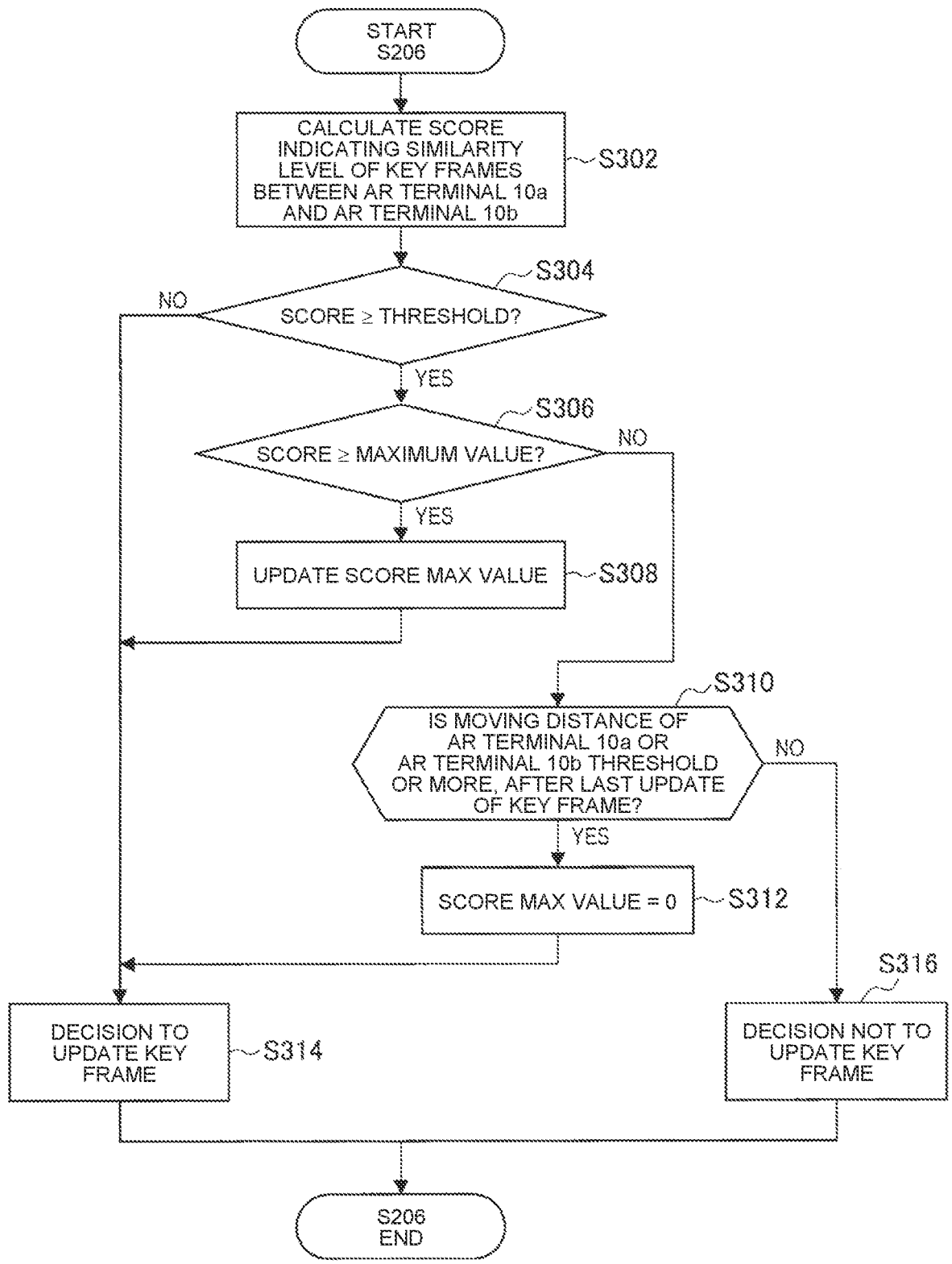
FIG. 6 is a flowchart illustrating a flow of a key frame update decision process according to the embodiment.

Next, a flow of the key frame update decision process according to the embodiment of the present disclosure will be described with reference to FIG. 6. FIG. 6 is a flowchart illustrating a flow of the key frame update decision process according to the embodiment of the present disclosure. In addition, the key frame update decision process according to the present embodiment is supposed to be performed by the server 20 according to the present embodiment.

As illustrated in FIG. 6, first, the server 20 calculates a score indicating the similarity level between the update destination candidate key frame acquired by the AR terminal 10a and the update destination candidate key frame acquired by the AR terminal 10b (S302). After calculating the score, the server 20 confirms whether the score is the first threshold or more (S304).

When the score is not the first threshold or more (S304/NO), the server 20 decides to update the position determination key frame (S314), and ends the key frame update decision process.

When the score is the first threshold or more (S304/YES), the server 20 confirms whether the score is the maximum value or more (S306). When the score is the maximum value or more (S306/YES), the server 20 updates the maximum value of the score (S308). After updating the maximum value, the server 20 decides to update the position determination key frame (S314), and ends the key frame update decision process.

When the score is not the maximum value or more (S306/NO), the server 20 confirms whether the moving distance of the AR terminal 10a or the AR terminal 10b is the second threshold or more after the last update of the position determination key frame (S310).

When the moving distance is the second threshold or more (S310/YES), the server 20 updates the maximum value of the score to 0 (S312). After updating the maximum value, the server 20 decides to update the position determination key frame (S314), and ends the key frame update decision process.

When the moving distance is not the second threshold or more (S310/NO), the server 20 decides not to update the position determination key frame (S316), and ends the key frame update decision process.

(3) Processes in Information Processing System 1000

Subsequently, a flow of the processes in the information processing system 1000 according to the embodiment of the present disclosure will be described with reference to FIG. 7. FIG. 7 is a sequence diagram illustrating a flow of processes in the information processing system 1000 according to the embodiment of the present disclosure.

As illustrated in FIG. 7, first, the AR terminal 10a acquires the update destination candidate key frame by executing the processes of S202 to S204 (S402). After the acquisition, the AR terminal 10a transmits the acquired update destination candidate key frame to the server 20 (S404). Similarly, the AR terminal 10b acquires the update destination candidate key frame by executing the processes of S202 to S204 (S406). After the acquisition, the AR terminal 10b transmits the acquired update destination candidate key frame to the server 20 (S408).

After having received the update destination candidate key frames from the AR terminal 10a and the AR terminal 10b, the server 20 performs key frame update decision process by executing S206 (S410). After the key frame update decision process, the server 20 transmits the decision result to the AR terminal 10a and the AR terminal 10b (S412 and S416).

After having received the decision result from the server 20, the AR terminal 10a executes the processes of S208 to S218 (S414). Similarly, after having received the decision result from the server 20, the AR terminal 10b executes the processes of S208 to S218 (S418).

1-4. Specific Examples

The configuration example according to the present embodiment has been described as above. Next, a specific example according to the present embodiment will be described with reference to FIGS. 8A to 11. A specific example regarding updating the position determination key frame will be described below.

(1) First Specific Example

Figure 8A:
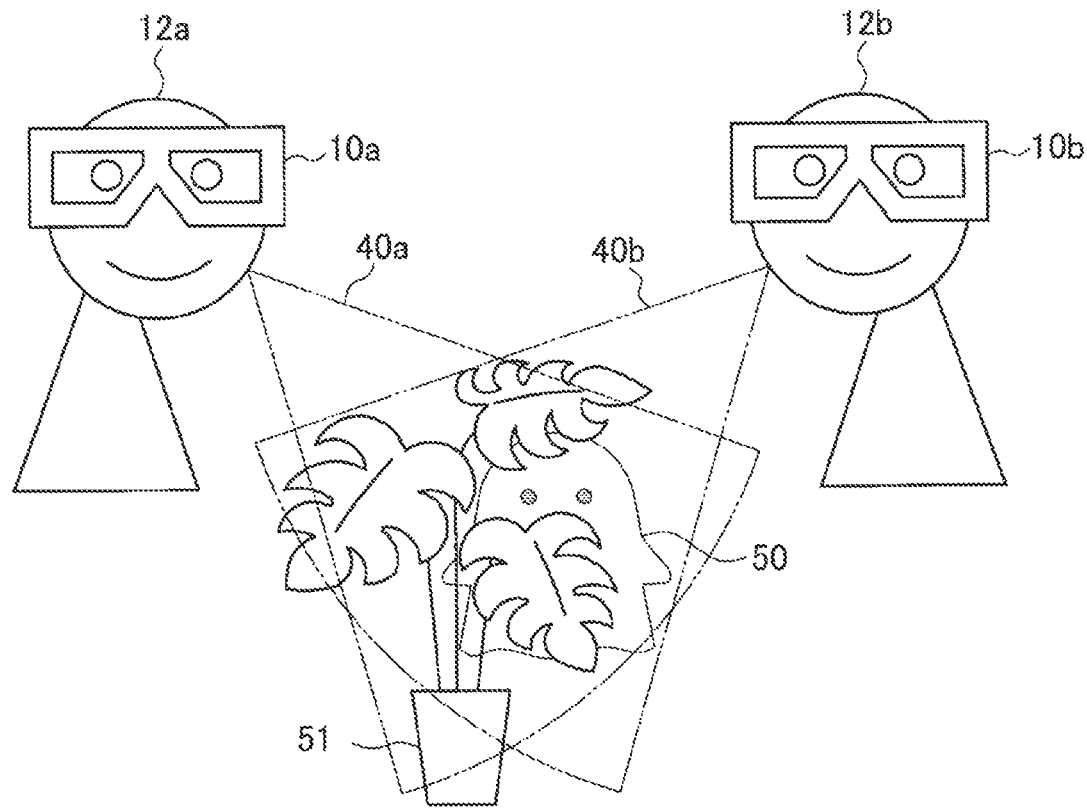
FIG. 8A is a diagram illustrating a positional relationship among a plurality of users according to a first specific example of the embodiment.
Figure 8B:
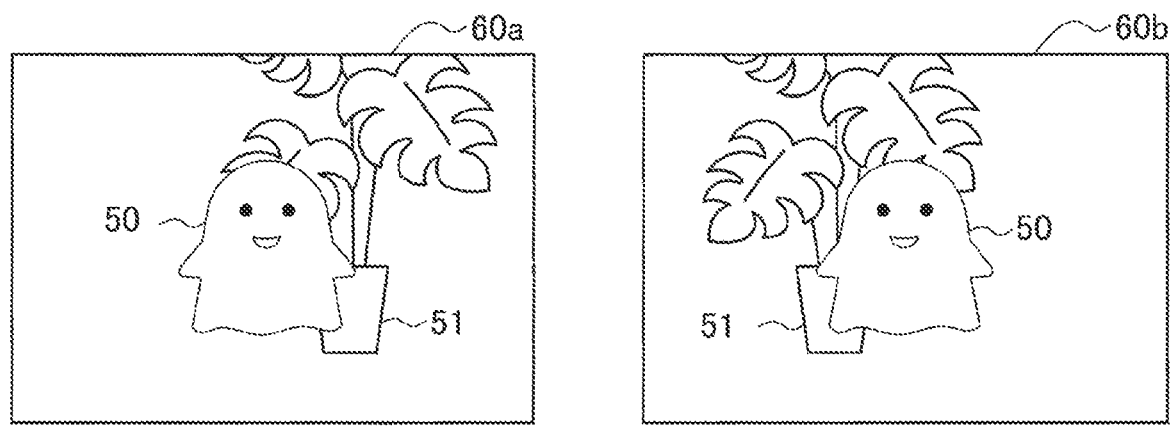
FIG. 8B is a diagram illustrating individual user's views according to the first specific example of the embodiment.

First, an example of updating the position determination key frame when the viewing directions of the user 12a and the user 12b are the same will be described with reference to FIGS. 8A and 8B. FIG. 8A is a diagram illustrating a positional relationship among a plurality of users 12 in a first specific example according to the embodiment of the present disclosure. FIG. 8B is a diagram illustrating views of individual users 12 in the first specific example according to the embodiment of the present disclosure. Note that the time in the first specific example is supposed to be time $t_1$.

As illustrated in FIG. 8A, a virtual object being a spook 50 and a real object being a house plant 51 are within a visual field 40a of the user 12a wearing the AR terminal 10a. At this time, the user 12a is viewing the spook 50 and the house plant 51 as illustrated on the left of FIG. 8B.

In addition, the virtual object of the spook 50 and the real object of the house plant 51 are also within a visual field 40b of the user 12b wearing the AR terminal 10b. At this time, the user 12b is viewing the spook 50 and the house plant 51 as illustrated on the right of FIG. 8B.

When the key frame update decision process is performed at time $t_1$, the AR terminal 10a determines an update destination candidate key frame based on a photographic image 60a illustrated on the left of FIG. 8B. Furthermore, the AR terminal 10b acquires an update destination candidate key frame based on the photographic image 60b illustrated on the right of FIG. 8B. Since the photographic image 60a and the photographic image 60b are similar, update destination candidate key frames acquired based on the individual photographic images are also similar. Therefore, the key frame update decision process in the server 20 decides that the AR terminal 10 will not update the position determination key frame. In addition, the AR terminal 10a and the AR terminal 10b will not update the position determination key frame, and continue to use the identical key frame.

(2) Second Specific Example

Figure 9A:
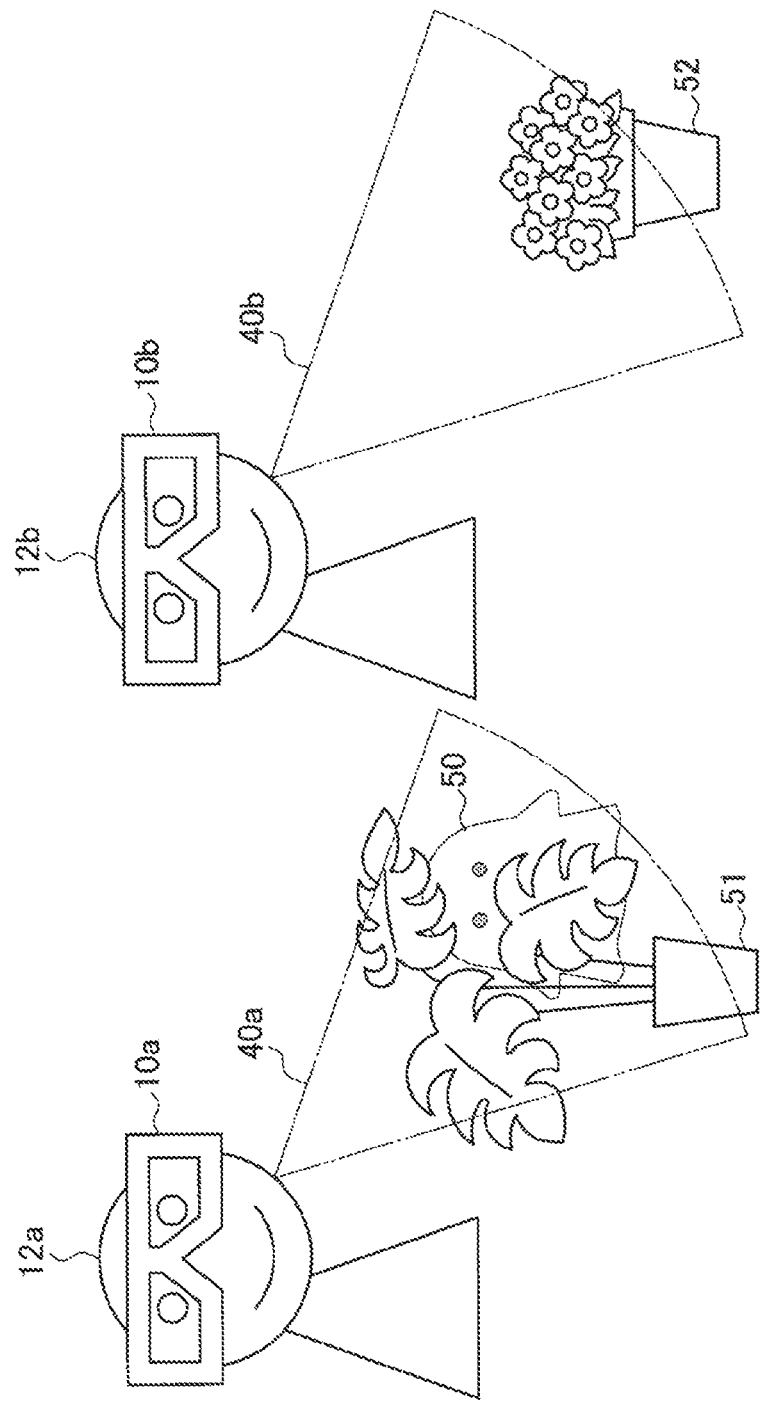
FIG. 9A is a diagram illustrating a positional relationship among a plurality of users according to a second specific example of the embodiment.

Next, an example of updating the position determination key frame when the viewing directions of the user 12a and the user 12b are different will be described with reference to FIGS. 9A and 9B. FIG. 9A is a diagram illustrating a positional relationship among a plurality of users 12 in a second specific example according to the embodiment of the present disclosure. FIG. 9B is a diagram illustrating views of individual users 12 in the second specific example according to the embodiment of the present disclosure. Note that the time in the second specific example is supposed to be time $t_2$.

The user 12a has not changed the direction or position of the visual field 40a with respect to those at time $t_1$ of the first specific example. Therefore, as illustrated in FIG. 9A, a virtual object of a spook 50 and a real object of a house plant 51 are within a visual field 40a of the user 12a wearing the AR terminal 10a. At this time, the user 12a is viewing the spook 50 and the house plant 51 as illustrated on the left of FIG. 9B.

In contrast, the user 12b has not changed the position but has changed the direction of the visual field 40b with respect to the direction at time $t_1$ described in the first specific example. Therefore, as illustrated in FIG. 9A, only a real object of a flower 52 is within the visual field 40b of the user 12b wearing the AR terminal 10b. At this time, the user 12b is viewing the flower 52 as illustrated on the right of FIG. 9B.

When the key frame update decision process is performed at time $t_2$, the AR terminal 10a determines an update destination candidate key frame based on a photographic image 60a illustrated on the left of FIG. 9B. Furthermore, the AR terminal 10b acquires an update destination candidate key frame based on the photographic image 60b illustrated on the right of FIG. 9B. Since the photographic image 60a and the photographic image 60b are dissimilar, update destination candidate key frames acquired based on the individual photographic images are also dissimilar. Therefore, the key frame update decision process in the server 20 decides that the AR terminal 10 will update the position determination key frame. In addition, the AR terminal 10a and the AR terminal 10b will update the position determination key frame.

(3) Third Specific Example

Next, an example of updating the position determination key frame when the positional relationship between the user 12a and the user 12b has changed will be described with reference to FIGS. 10A and 10B. FIG. 10A is a diagram illustrating a positional relationship among a plurality of users 12 in a third specific example according to the embodiment of the present disclosure. FIG. 10B is a diagram illustrating views of individual users 12 in the third specific example according to the embodiment of the present disclosure. Note that the time in the third specific example is supposed to be time $t_3$.

The user 12a has not changed the direction and position of the visual field 40a from the time $t_2$ of the second specific example. Therefore, as illustrated in FIG. 10A, a virtual object of a spook 50 and a real object of a house plant 51 are within a visual field 40a of the user 12a wearing the AR terminal 10a. At this time, the user 12a is viewing the spook 50 and the house plant 51 as illustrated on the left of FIG. 10B.

In contrast, the user 12b has changed the direction of the visual field 40b with respect to the direction at time $t_2$ described in the second specific example, this change is in the direction same as the direction at time $t_1$ of the first specific example. Therefore, as illustrated in FIG. 10A, a virtual object of a spook 50 and a real object of a house plant 51 are within a visual field 40b of the user 12b wearing the AR terminal 10b. At this time, the user 12b is viewing the spook 50 and the house plant 51 as illustrated on the right of FIG. 10B. However, the user 12b has changed the position with respect to the position at time $t_2$ described in the second specific example such that the moving distance is the second threshold or more.

When the key frame update decision process is performed at time $t_2$, the AR terminal 10a determines an update destination candidate key frame based on a photographic image 60a illustrated on the left of FIG. 10B. Furthermore, the AR terminal 10b acquires an update destination candidate key frame based on the photographic image 60b illustrated on the right of FIG. 10B. Since the photographic image 60a and the photographic image 60b are similar, update destination candidate key frames acquired based on the individual photographic images also similar. However, since the moving distance of the user 12b is the second threshold or more, it is decided in the key frame update decision process in the server 20 that the position determination key frame is to be updated. In addition, the AR terminal 10a and the AR terminal 10b will update the position determination key frame.

(4) Fourth Specific Example

Finally, the time-series change of the position determination key frames in the first to third specific examples described above will be described with reference to FIG. 11. FIG. 11 is a diagram illustrating time-series changes of key frames in the fourth specific example according to the embodiment of the present disclosure.

The table illustrated in FIG. 11 illustrates time-series changes in the position determination key frames of the AR terminal 10a and the AR terminal 10b. Note that the AR terminal 10a uses the position determination key frames 1 to 5, while the AR terminal 10b uses the position determination key frames 6 to 10.

First, in a duration from time $t_0$ and time $t_1$, the position determination key frames of the AR terminal 10a have changed in the order of position determination key frames 3, 5, 4, and 1. Similarly, the position determination key frames of the AR terminal 10b have changed in the order of the position determination key frames 8, 10, 9, and 7.

As described in the above-described first specific example, the key frame update decision process at time $t_1$ has decided that the AR terminal 10 would not update the position determination key frame. Based on this decision, during a duration from time $t_1$ to time $t_2$, the position determination key frame 1 is continuously used in the AR terminal 10a, while the position determination key frame 7 is continuously used in the AR terminal 10b.

As described in the above second specific example, the key frame update decision process at time ta has decided that the AR terminal 10 would update the position determination key frame. Based on this decision, in a duration from time $t_2$ to time $t_3$, the position determination key frames of the AR terminal 10a have changed in the order of the position determination key frames 3, 1, 2, 1, and 4. Similarly, the position determination key frames of the AR terminal 10b have changed in the order of the position determination key frames 6, 9, 6, 8, and 10.

As described in the above-described third specific example, the key frame update decision process at time $t_3$ has decided that the AR terminal 10 would update the position determination key frame. Based on this decision, at time $t_3$ or later time, the position determination key frames of the AR terminal 10a have changed in the order of the position determination key frames 4, 1, 3, . . . . Similarly, the position determination key frames of the AR terminal 10b have changed in the order of the position determination key frames 10, 9, 10, . . . .

1-5. Modifications

Hereinafter, modifications of the embodiment of the present disclosure will be described. Note that the modifications described below may be applied to the embodiments of the present disclosure separately, or may be applied to the embodiments of the present disclosure in combination. Furthermore, the modification may be applied instead of the configuration described in the embodiment of the present disclosure, or may be additionally applied to the configuration described in the embodiment of the present disclosure.

(1) First Modification

Figure 12:
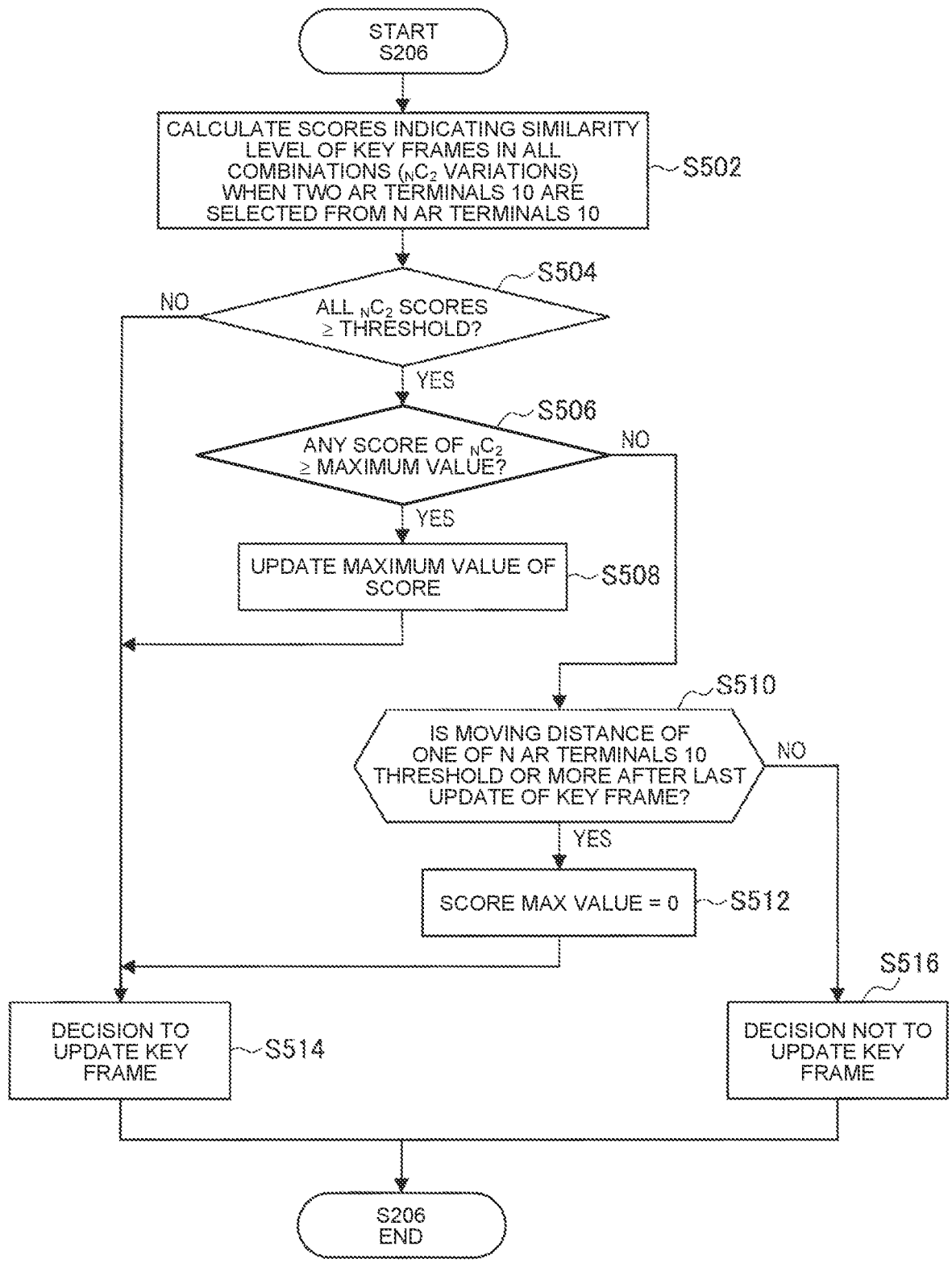
FIG. 12 is a flowchart illustrating a flow of a key frame update decision process according to a first modification of the embodiment.

The above-described embodiment is an example in which the number of AR terminals 10 sharing the identical virtual object is two (two users 12). However, the number of AR terminals 10 sharing the identical virtual object is not particularly limited, and may be any number. Hereinafter, an example in which the number of AR terminals 10 sharing the identical virtual object is three will be described with reference to FIG. 12. FIG. 12 is a flowchart illustrating a flow of key frame update decision process in the first modification of the embodiment of the present disclosure.

The server 20 receives the update destination candidate key frames from all the AR terminals 10 sharing the identical virtual object, and performs the key frame update decision process in consideration of all combinations of the received update destination candidate key frames. For example, the server 20 calculates a score of similarity level in all combinations of the received update destination candidate key frames, and compares the calculated score with the maximum value. Furthermore, the server 20 compares the moving distances of all the AR terminals 10 with the second threshold.

With such a configuration, the server 20 can perform the key frame update decision process even when there are three or more AR terminals 10 sharing an identical virtual object. In addition, each of the three or more AR terminals 10 can reduce the difference in display positions in a case where the three or more display terminals display an identical virtual object based on the result of the key frame update decision process.

Here, a flow of the key frame update decision process in the first modification will be described with reference to FIG. 12. As illustrated in FIG. 12, the server 20 first calculates scores indicating the similarity levels of the update destination candidate key frames in all combinations ($_NC_2$ variations) in a case where two AR terminals 10 are selected from N AR terminals 10 (S502). In the present modification, since the number of AR terminals 10 is three, there are $_3C_2$=3 combinations.

After calculating the $_NC_2$ scores, the server 20 confirms whether the $_NC_2$ scores are the first threshold or more (S504). In the present modification, it is confirmed whether the $_3C_2$ scores are the first threshold or more.

When the score is not the first threshold or more (S504/NO), the server 20 decides to update the position determination key frame (S514), and ends the key frame update decision process.

When the score is the first threshold or more (S504/YES), the server 20 confirms whether at least one score of the $_4C_2$ scores is the maximum value or more (S506). When at least one of the scores is the maximum value or more (S506/YES), the server 20 updates the maximum value of the score (S508). After updating the maximum value, the server 20 decides to update the position determination key frame (S514), and ends the key frame update decision process.

When all the scores are not the maximum value or more (S506/NO), the server 20 confirms whether the moving distance of at least one of the N AR terminals 10 is the second threshold or more after the last update of the position determination key frame (S510).

When the moving distance of at least one AR terminal 10 is the second threshold or more (S510/YES), the server 20 updates the maximum value of the score to 0 (S512). After updating the maximum value, the server 20 decides to update the position determination key frame (S514), and ends the key frame update decision process.

When the moving distance of at least one AR terminal 10 is not the predetermined threshold or more (S510/NO), the server 20 decides not to update the position determination key frame (S516), and ends the key frame update decision process.

(2) Second Modification

Figure 13:
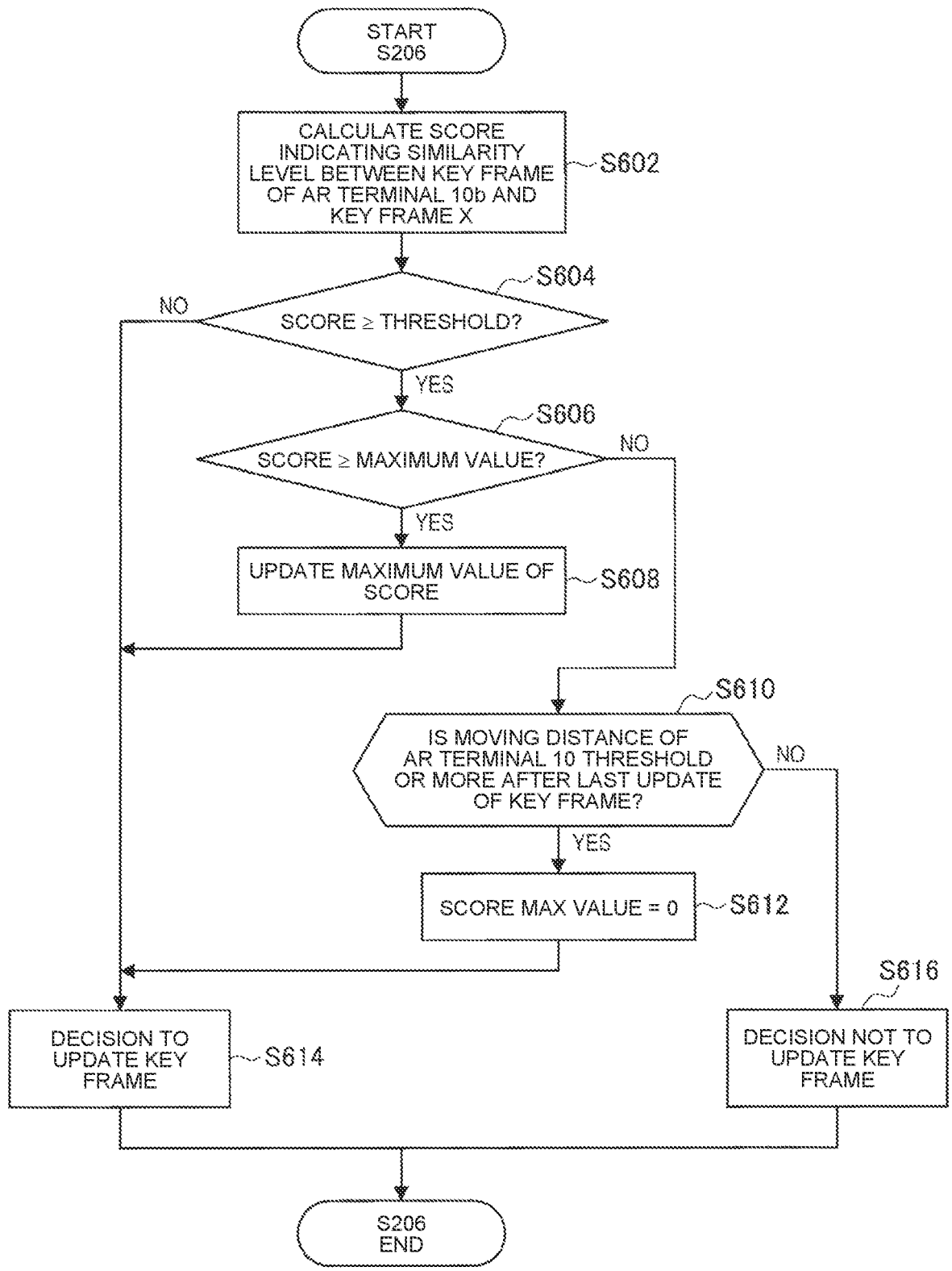
FIG. 13 is a flowchart illustrating a flow of a key frame update decision process according to a second modification of the embodiment.

Although the above-described embodiment is an example in which a plurality of AR terminals 10 shares an identical virtual object at the same time point, the time points at which the plurality of AR terminals 10 shares the identical virtual object may be different from each other. Hereinafter, an example in which a plurality of AR terminals 10 shares the identical virtual object at different times will be described with reference to FIG. 13. FIG. 13 is a flowchart illustrating a flow of key frame update decision process in a second modification of the embodiment of the present disclosure.

It is assumed that the user 12a of the AR terminal 10a views a virtual object at a predetermined position where the virtual object is displayed at certain time $t_4$. It is assumed that the identical virtual object is viewed at the same predetermined position at time $t_5$ different from the time when the user 12a viewed the virtual object. At this time, the virtual object should be displayed on the AR terminal 10b of the user 12b in the same manner as when the user 12a views the virtual object.

Specific examples of this case include an AR puzzle-solving game and an AR escape game. For example, it is assumed that the user 12a places a virtual object at a position in a room and leaves the room. Subsequently, it is assumed that the user 12b enters the same room and needs to grasp the position of the virtual object placed by the user 12a. At this time, if the user 12b does not accurately grasp the position of the virtual object placed by the user 12a, the progress of the game would be affected. For example, it is assumed that there are a red chair and a blue chair in a room, and the user 12a places a virtual object on the red chair. However, it is assumed that a position shift occurs when the user 12b views the virtual object, and the virtual object is displayed on the blue chair. In this case, the user 12b could not obtain the correct answer of the position where the user 12a has placed the virtual object, and could not clear the game.

In order to solve this, even in different time series, the server 20 needs to control the display of the virtual object based on the update destination candidate key frame of the AR terminal 10a and the update destination candidate key frame of the AR terminal 10b. Unfortunately, however, since the AR terminal 10a of the user 12a is not at the same position as the AR terminal 10b of the user 12b at time $t_s$, the server 20 cannot acquire the update destination candidate key frame of the AR terminal 10a at the position.

To handle this, the control unit 220 of the server 20 calculates the similarity level between the operation state of the AR terminal 10a having a specific positional relationship with a predetermined position and the operation state of the AR terminal 10b having a specific relationship with the predetermined position in time series different from the operation state of the AR terminal 10a, and then performs the key frame update decision process.

The specific positional relationship with the predetermined position is, for example, a positional relationship between the predetermined position and the AR terminal 10 when the user 12 is viewing the virtual object displayed at the predetermined position. Accordingly, the operation state of the AR terminal 10 having a specific positional relationship with the predetermined position is, in other words, the operation state of the AR terminal 10 when the user 12 is viewing the virtual object displayed at the predetermined position.

For example, the server 20 acquires a position determination key frame acquired based on the operation state of the AR terminal 10a of the user 12a who has first viewed the virtual object displayed at the predetermined position, as a reference key frame (hereinafter, also referred to as a "key frame X"). When the user 12b looks at a virtual object displayed at a predetermined position at a time different from that of the user 12a, the server 20 acquires an update destination candidate key frame acquired based on the operation state of the AR terminal 10b of the user 12b. Subsequently, the server 20 calculates the similarity level between the key frame X and the update destination candidate key frame of the AR terminal 10b, and then performs the key frame update decision process.

With such a configuration, even when the time points at which the plurality of users views the identical virtual object are not the same, it is possible to reduce the difference in display positions when the plurality of display terminals displays the identical virtual object.

Here, a flow of the key frame update decision process in the second modification will be described with reference to FIG. 13. Note that the position determination key frame of the AR terminal 10a of the user 12a who first views a predetermined position is defined as the key frame X. In addition, it is assumed that the key frame update decision process is executed when the user 12b views the predetermined position at a time later than the viewing time of the user 12a.

As illustrated in FIG. 13, the server 20 first calculates a score indicating the similarity level between the position determination key frame of the AR terminal 10b and the key frame X (S602). After calculating the score, the server 20 confirms whether the score is a first threshold or more (S604).

When the score is not the first threshold or more (S604/NO), the server 20 decides to update the position determination key frame (S614), and ends the key frame update decision process.

When the score is the first threshold or more (S604/YES), the server 20 confirms whether the score is the maximum value or more (S606). When the score is the maximum value or more (S606/YES), the server 20 updates the maximum value of the score (S608). After updating the maximum value, the server 20 decides to update the position determination key frame (S614), and ends the key frame update decision process.

When the score is not the maximum value or more (S606/NO), the server 20 confirms whether the moving distance of the AR terminal 10a or the AR terminal 10b is the second threshold or more after the last update of the position determination key frame (S610).

When the moving distance is the second threshold or more (S610/YES), the server 20 updates the maximum value of the score to 0 (S612). After updating the maximum value, the server 20 decides to update the position determination key frame (S614), and ends the key frame update decision process.

When the moving distance is not the second threshold or more (S610/NO), the server 20 decides not to update the position determination key frame (S616), and ends the key frame update decision process.

2. Second Embodiment

The first embodiment has been described above. A second embodiment of the present disclosure will be described. Although the above-described embodiment is an example in which the key frame update decision process is performed by the server 20, the key frame update process may be performed by the AR terminal 10.

The AR terminal 10 according to the second embodiment further includes the same function as the control unit 220 of the server 20 described in the first embodiment, in addition to the function of the AR terminal 10 described in the first embodiment. With such a configuration, the AR terminal 10 according to the second embodiment can perform the key frame update decision process independently of the server 20.

Note that, in a case where there is a plurality of AR terminals 10 capable of executing the key frame update decision process, the AR terminal to perform the key frame update decision process may be determined according to the processing capability of individual AR terminals 10. For example, the AR terminal having the highest processing capability will be determined as a terminal to perform the key frame update decision process.

3. Hardware Configuration Example

Figure 14:
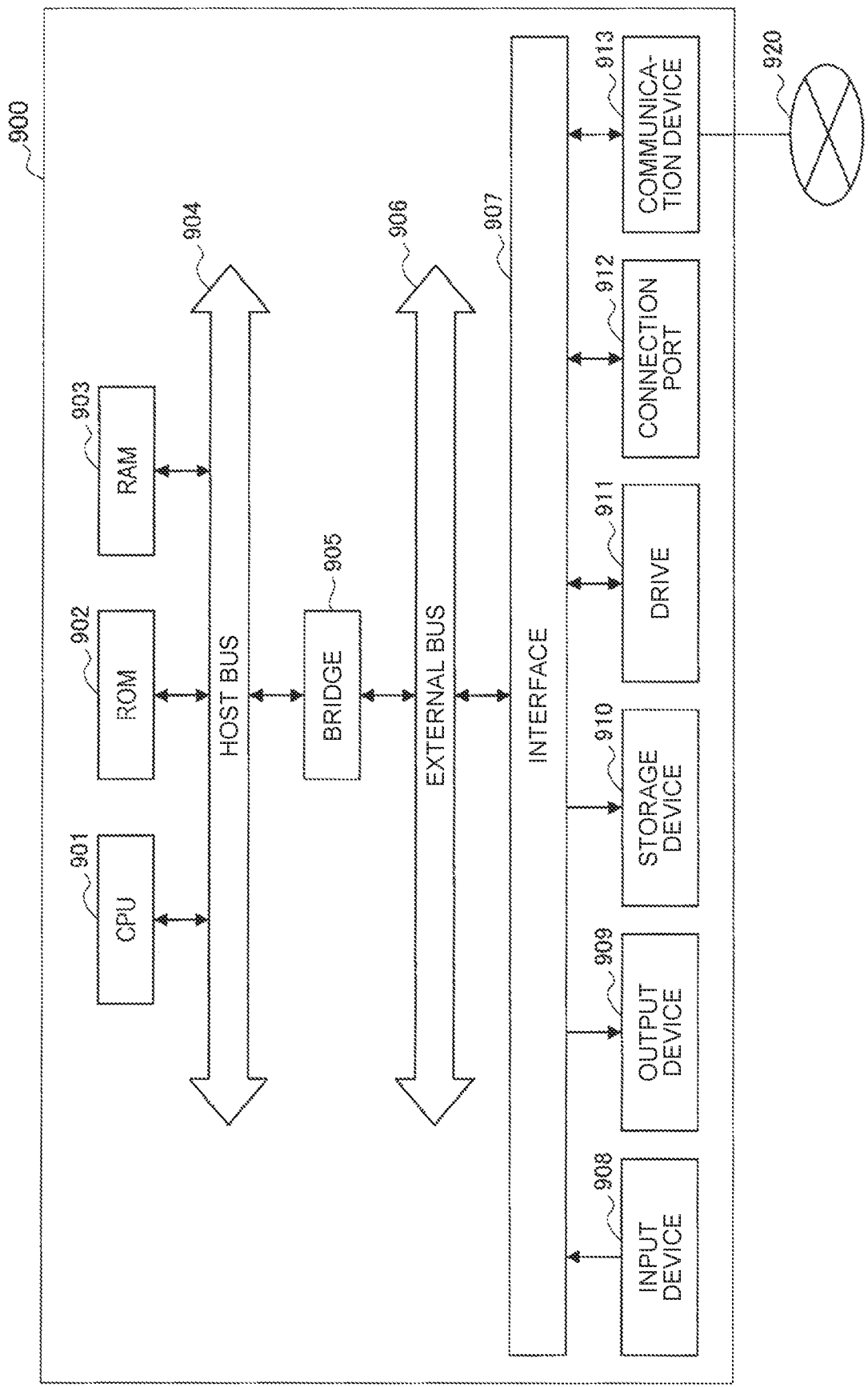
FIG. 14 is a block diagram illustrating a hardware configuration example of an information processing device according to the embodiment.

Finally, a hardware configuration example of the information processing device according to the present embodiment will be described with reference to FIG. 14. FIG. 14 is a block diagram illustrating a hardware configuration example of an information processing device according to the present embodiment. Note that an information processing device 900 illustrated in FIG. 14 can actualize the server 20 illustrated in FIG. 3, for example. The processes of the server 20 according to the present embodiment are implemented by cooperative operations of software and hardware described below.

As illustrated in FIG. 14, the information processing device 900 includes a central processing unit (CPU) 901, read only memory (ROM) 902, and random access memory (RAM) 903. Furthermore, the information processing device 900 includes a host bus 904, a bridge 905, an external bus 906, an interface 907, an input device 908, an output device 909, a storage device 910, a drive 911, a connection port 912, and a communication device 913. Note that the hardware configuration illustrated here is an example, and some of the components may be omitted. In addition, the hardware configuration may further include components other than the components illustrated here.

The CPU 901 functions as, for example, an arithmetic processing device or a control device, and controls the entire or part of operation of each of components based on various programs recorded in the ROM 902, the RAM 903, or the storage device 910. The ROM 902 is a means to store a program loaded by the CPU 901, data used for calculation, or the like. The RAM 903 temporarily or permanently stores, for example, a program loaded by the CPU 901, various parameters that appropriately change when the program is executed, or the like. These are interconnected by a host bus 904 including a CPU bus or the like. The CPU 901, the ROM 902, and the RAM 903 can implement the functions of the control unit 220 described with reference to FIG. 3, for example, in cooperation with software.

The CPU 901, the ROM 902, and the RAM 903 are interconnected via the host bus 904 capable of high-speed data transmission, for example. On the other hand, the host bus 904 is connected to the external bus 906 having a relatively low data transmission speed via the bridge 905, for example. Furthermore, the external bus 906 is connected to various components via the interface 907.

The input device 908 is actualized by a device to which the user input information, such as a mouse, a keyboard, a touch panel, a button, a microphone, a switch, and a lever. Furthermore, the input device 908 may be, for example, a remote control device using infrared rays or other radio waves, or an externally connected device such as a mobile phone or a PDA that supports the operation of the information processing device 900. Furthermore, the input device 908 may include, for example, an input control circuit that generates an input signal based on the information input by the user using the above input means and outputs the input signal to the CPU 901. By operating the input device 908, the user of the information processing device 900 can input various data to the information processing device 900 and give an instruction on the processing operation.

In addition, the input device 908 can be formed by a device that detects information regarding the user. For example, the input device 908 can include various sensors such as an image sensor (for example, a camera), a depth sensor (for example, a stereo camera), an acceleration sensor, a gyro sensor, a geomagnetic sensor, an optical sensor, a sound sensor, a distance measuring sensor (for example, a time of flight (ToF) sensor), and a force sensor. Furthermore, the input device 908 may acquire information regarding the self-state of the information processing device 900, such as the posture and moving speed of the information processing device 900, and information regarding the surrounding environment of the information processing device 900, such as brightness and noise around the information processing device 900. Furthermore, the input device 908 may include a global navigation satellite system (GNSS) module that receives a GNSS signal (for example, a global positioning system (GPS) signal from a GPS satellite) from a GNSS satellite and measures position information including the latitude, longitude, and altitude of the device. Furthermore, regarding the position information, the input device 908 may detect the position by Wi-Fi (registered trademark), transmission and reception using a mobile phone, a PHS, a smartphone, or the like, near field communication, or the like.

The output device 909 is formed by a device capable of visually or audibly notifying the user of acquired information. Examples of such devices include display devices such as CRT display devices, liquid crystal display devices, plasma display devices, EL display devices, laser projectors, LED projectors, and lamps, audio output devices such as speakers and headphones, and printer devices. The output device 909 outputs the results obtained by various processes performed by the information processing device 900, for example. Specifically, the display device visually displays the results obtained by various processes performed by the information processing device 900 in various formats such as texts, images, tables, and graphs. The audio output device converts an audio signal composed of reproduced audio data, acoustic data, or the like into an analog signal and output the signal audibly.

The storage device 910 is a data storage device formed as an example of a storage unit of the information processing device 900. The storage device 910 is actualized by, for example, a magnetic storage device such as an HDD, a semiconductor storage device, an optical storage device, an optical magnetic storage device, or the like. The storage device 910 may include a storage medium, a recording device that records data on the storage medium, a reading device that reads data from the storage medium, a deleting device that deletes the data recorded on the storage medium, and the like. This storage device 910 stores programs executed by the CPU 901, various data, as well as various data acquired from the outside, and the like. The storage device 910 can implement the function of the storage unit 230 described with reference to FIG. 3, for example.

The drive 911 is a reader/writer for a storage medium, and is built in or externally connected to the information processing device 900. The drive 911 reads information recorded on a removable storage medium such as a mounted magnetic disk, optical disk, magneto-optical disk, or semiconductor memory, and outputs the read information to the RAM 903. The drive 911 can also write information to the removable storage medium.

The connection port 912 is, for example, a port for connecting an external connection device, such as a universal serial bus (USB) port, an IEEE 1394 port, a small computer system interface (SCSI), an RS-232C port, or an optical audio terminal.

The communication device 913 is, for example, a communication interface formed by a communication device or the like for connecting to a network 920. The communication device 913 is, for example, a communication card for wired or wireless Local Area Network (LAN), Long Term Evolution (LTE), Bluetooth (registered trademark), Wireless USB (WUSB), or the like. Furthermore, the communication device 913 may be a router for optical communication, an Asymmetric Digital Subscriber Line (ADSL) router, a modem for various communications, or the like. The communication device 913 can transmit and receive signals or the like to and from the Internet and other communication devices in accordance with a predetermined protocol such as TCP/IP. The communication device 913 can implement the function of the communication unit 210 described with reference to FIG. 3, for example.

The network 920 is a wired or wireless transmission path for information transmitted from a device connected to the network 920. For example, the network 920 may include a public network such as the Internet, a telephone network, and a satellite communication network, or various local area networks (LANs) including Ethernet (registered trademark), wide area networks (WANs), or the like. Furthermore, the network 920 may include a dedicated network such as an Internet protocol-virtual private network (IP-VPN).

An example of the hardware configuration capable of implementing the functions of the information processing device 900 according to the present embodiment has been described above. Each of the above-described components may be actualized by using a general-purpose member, or may be actualized by hardware devices specialized for the function of individual components. Therefore, it is possible to appropriately change the hardware configuration to be used according to the technical level at the time of carrying out the present embodiment.

4. Supplement

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the series of processes to be executed by individual devices described in the present specification may be implemented by using any of software, hardware, or a combination of software and hardware. The program constituting the software is stored in advance in, for example, a recording medium (non-transitory medium) provided inside or outside of each of devices. Then, each of programs is read into the RAM at the time of execution by the computer, for example, and is executed by a processor such as a CPU.

Furthermore, the processes described using the flowchart and the sequence diagram in the present specification do not necessarily have to be executed in the illustrated order. Some processing steps may be performed in parallel. In addition, additional processing steps may be employed, and some processing steps may be omitted.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

Note that the following configurations also belong to the technical scope of the present disclosure.

(1)
An information processing device comprising
a control unit that controls a display terminal that arranges a virtual object in a real space by using a coordinate system associated with the real space,
wherein the control unit determines whether to update first spatial information of a first display terminal and second spatial information of a second display terminal, which are used for determining a position of the virtual object, based on a first operation state of the first display terminal and a second operation state of the second display terminal that shares the virtual object with the first display terminal.

(2)
The information processing device according to (1), wherein the control unit determines whether to update the first spatial information and the second spatial information based on whether the first operation state and the second operation state are similar.

(3)
The information processing device according to (2),
wherein the control unit determines not to update the first spatial information and the second spatial information when the first operation state and the second operation state are similar, and
the control unit determines to update the first spatial information and the second spatial information when the first operation state and the second operation state are dissimilar.

(4)
The information processing device according to (2) or (3), wherein the control unit calculates a similarity level between the first operation state and the second operation state, and decides whether the first operation state and the second operation state are similar based on a result of comparison of the similarity level with a first threshold.

(5)
The information processing device according to (4), wherein the control unit calculates the similarity level based on third spatial information which is an update destination candidate acquired by the first display terminal in the first operation state and fourth spatial information which is an update destination candidate acquired by the second display terminal in the second operation state.

(6)
The information processing device according to (5), wherein the control unit performs a process of matching between a feature point included in the third spatial information and a feature point included in the fourth spatial information, and calculates the similarity level based on a number of feature points successful in the matching.

(7)
The information processing device according to (4), wherein the control unit changes the first threshold in accordance with a positional relationship between the first display terminal and the second display terminal.

(8)
The information processing device according to any one of (4) to (7),
wherein the control unit further determines whether to update the first spatial information and the second spatial information based on whether the similarity level exceeds a third threshold, and
the third threshold is a maximum value of a similarity level calculated in a period in which a predetermined condition is satisfied.

(9)
The information processing device according to (8),
wherein the control unit determines to update the first spatial information and the second spatial information when the similarity level exceeds the third threshold, and
the control unit determines not to update the first spatial information or the second spatial information when the similarity level does not exceed the third threshold.

(10)
The information processing device according to any one of (2) to (9), wherein the control unit further determines whether to update the first spatial information and the second spatial information in accordance with a moving distance of the first display terminal or a moving distance of the second display terminal after a last update of the first spatial information and the second spatial information.

(11)

The information processing device according to (10), wherein the control unit determines to update the first spatial information and the second spatial information when the moving distance is a second threshold or more, and the control unit determines not to update the first spatial information or the second spatial information when the moving distance is not the second threshold or more.

(12)

The information processing device according to (4), wherein the control unit calculates the similarity level between the first operation state having a specific positional relationship with a predetermined position and the second operation state having a specific relationship with the predetermined position in time series different from the first operation state.

(13)

An information processing device comprising:
an output unit including a first output device that presents a virtual object to a first user; and
a control unit that determines a position of the virtual object to be arranged in a coordinate system associated with a real space,
wherein the control unit determines whether to update first spatial information of the first output device and second spatial information of the second output device, which are used for determining the position of the virtual object, based on a first operation state of the first output device and a second operation state of a second output device which is externally provided and shares the virtual object with the first output device.

(14)

An information processing method to be executed by a processor, the method comprising:
controlling a display terminal that arranges a virtual object in a real space by using a coordinate system associated with the real space; and
determining whether to update first spatial information of a first display terminal and second spatial information of a second display terminal, which are used for determining a position of the virtual object, based on a first operation state of the first display terminal and a second operation state of the second display terminal that shares the virtual object with the first display terminal.

(15)

A recording medium that records a program that causes a computer to execute processes comprising:
controlling a display terminal that arranges a virtual object in a real space by using a coordinate system associated with the real space; and
determining whether to update first spatial information of a first display terminal and second spatial information of a second display terminal, which are used for determining a position of the virtual object, based on a first operation state of the first display terminal and a second operation state of the second display terminal that shares the virtual object with the first display terminal.

REFERENCE SIGNS LIST

10 AR TERMINAL
12 USER
20 SERVER
30 NETWORK
120 COMMUNICATION UNIT
130 SENSOR UNIT
140 CONTROL UNIT
150 STORAGE UNIT
160 OUTPUT UNIT
210 COMMUNICATION UNIT
220 CONTROL UNIT
230 STORAGE UNIT
1000 INFORMATION PROCESSING SYSTEM
1402 SURROUNDING STATUS INFORMATION ACQUISITION UNIT
1404 SURROUNDING STATUS INFORMATION MANAGEMENT UNIT
1406 SPATIAL INFORMATION ACQUISITION UNIT
1408 SPATIAL INFORMATION MANAGEMENT UNIT
1410 IMAGE OUTPUT CONTROL UNIT
1412 OUTPUT IMAGE GENERATION UNIT

The invention claimed is:

1. An information processing device comprising
a control unit that controls a display terminal that arranges a virtual object in a real space by using a coordinate system associated with the real space,
wherein the control unit determines whether to update first spatial information of a first display terminal and second spatial information of a second display terminal, which are used for determining a position of the virtual object, based on a first operation state of the first display terminal and a second operation state of the second display terminal that shares the virtual object with the first display terminal, and
wherein the control unit is implemented via at least one processor.

2. The information processing device according to claim 1, wherein the control unit determines whether to update the first spatial information and the second spatial information based on whether the first operation state and the second operation state are similar.

3. The information processing device according to claim 2,
wherein the control unit determines not to update the first spatial information and the second spatial information when the first operation state and the second operation state are similar, and
the control unit determines to update the first spatial information and the second spatial information when the first operation state and the second operation state are dissimilar.

4. The information processing device according to claim 2, wherein the control unit calculates a similarity level between the first operation state and the second operation state, and decides whether the first operation state and the second operation state are similar based on a result of comparison of the similarity level with a first threshold.

5. The information processing device according to claim 4, wherein the control unit calculates the similarity level based on third spatial information which is an update destination candidate acquired by the first display terminal in the first operation state and fourth spatial information which is an update destination candidate acquired by the second display terminal in the second operation state.

6. The information processing device according to claim 5, wherein the control unit performs a process of matching between a feature point included in the third spatial information and a feature point included in the fourth spatial information, and calculates the similarity level based on a number of feature points successful in the matching.

7. The information processing device according to claim 4, wherein the control unit changes the first threshold in accordance with a positional relationship between the first display terminal and the second display terminal.

8. The information processing device according to claim 4,
wherein the control unit further determines whether to update the first spatial information and the second spatial information based on whether the similarity level exceeds a third threshold, and
the third threshold is a maximum value of a similarity level calculated in a period in which a predetermined condition is satisfied.

9. The information processing device according to claim 8,
wherein the control unit determines to update the first spatial information and the second spatial information when the similarity level exceeds the third threshold, and
the control unit determines not to update the first spatial information or the second spatial information
when the similarity level does not exceed the third threshold.

10. The information processing device according to claim 2, wherein the control unit further determines whether to update the first spatial information and the second spatial information in accordance with a moving distance of the first display terminal or a moving distance of the second display terminal after a last update of the first spatial information and the second spatial information.

11. The information processing device according to claim 10,
wherein the control unit determines to update the first spatial information and the second spatial information when the moving distance is a second threshold or more, and
the control unit determines not to update the first spatial information or the second spatial information
when the moving distance is not the second threshold or more.

12. The information processing device according to claim 4, wherein the control unit calculates the similarity level between the first operation state having a specific positional relationship with a predetermined position and the second operation state having a specific relationship with the predetermined position in time series different from the first operation state.

13. An information processing device comprising:
an output unit including a first output device that presents a virtual object to a first user; and
a control unit that determines a position of the virtual object to be arranged in a coordinate system associated with a real space,
wherein the control unit determines whether to update first spatial information of the first output device and second spatial information of the second output device, which are used for determining the position of the virtual object, based on a first operation state of the first output device and a second operation state of a second output device which is externally provided and shares the virtual object with the first output device, and
wherein the control unit is implemented via at least one processor.

14. An information processing method to be executed by a processor, the method comprising:
controlling a display terminal that arranges a virtual object in a real space by using a coordinate system associated with the real space; and
determining whether to update first spatial information of a first display terminal and second spatial information of a second display terminal, which are used for determining a position of the virtual object, based on a first operation state of the first display terminal and a second operation state of the second display terminal that shares the virtual object with the first display terminal.

15. A non-transitory computer-readable recording medium having embodied thereon a program, which when executed by a computer causes the computer to execute a method comprising:
controlling a display terminal that arranges a virtual object in a real space by using a coordinate system associated with the real space; and
determining whether to update first spatial information of a first display terminal and second spatial information of a second display terminal, which are used for determining a position of the virtual object, based on a first operation state of the first display terminal and a second operation state of the second display terminal that shares the virtual object with the first display terminal.

* * * * *